United States Patent
Ueno et al.

(10) Patent No.: US 8,876,300 B2
(45) Date of Patent: Nov. 4, 2014

(54) IMAGE PROJECTING APPARATUS HAVING FUNCTION OF CHANGING LIGHT EMISSION DIRECTION FOR EMITTING OBLIQUELY INCLINED LIGHT

(75) Inventors: Yasuhiro Ueno, Yokohama (JP); Yasushi Kitamura, Yokohama (JP); Jouji Yoshikawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 294 days.

(21) Appl. No.: 13/498,698

(22) PCT Filed: Sep. 28, 2010

(86) PCT No.: PCT/JP2010/066841
§ 371 (c)(1),
(2), (4) Date: Mar. 28, 2012

(87) PCT Pub. No.: WO2011/037259
PCT Pub. Date: Mar. 31, 2011

(65) Prior Publication Data
US 2012/0182531 A1     Jul. 19, 2012

(30) Foreign Application Priority Data

Sep. 28, 2009  (JP) .................................. 2009-223505

(51) Int. Cl.
*G03B 21/00* (2006.01)
(Continued)

(52) U.S. Cl.
CPC ................ *G03B 21/00* (2013.01); *H04N 9/317* (2013.01); *H04M 1/0272* (2013.01);
(Continued)

(58) Field of Classification Search
CPC ...... G03B 21/00; G03B 21/14; G03B 21/142; G03B 21/145; H04N 9/3141; H04N 9/317; H04N 9/3185; H04N 9/3129; H04N 9/3132; H04N 9/3194; G02B 26/08; H04M 1/0272; H04M 2250/54

USPC ...................... 353/70, 100–101, 85
See application file for complete search history.

(56) References Cited

U.S. PATENT DOCUMENTS 5,800,032 A * 9/1998 Uchiyama et al. ............... 353/69
6,367,933 B1 * 4/2002 Chen et al. ....................... 353/69
(Continued)

FOREIGN PATENT DOCUMENTS

| JP | 11258691 A   | 9/1999 |
| JP | 2006184632 A | 7/2006 |

(Continued)

OTHER PUBLICATIONS

International Search Report and Written Opinion for PCT/JP2010/066841 dated Nov. 2, 2010.
(Continued)

*Primary Examiner* — Tony Ko
*Assistant Examiner* — Jori S Reilly-Diakun
(74) *Attorney, Agent, or Firm* — Lowe Hauptman & Ham, LLP

(57) ABSTRACT

An image projecting apparatus for projecting an image includes a light source, a light emitting port, an emitting unit, and a control unit. The emitting unit causes the light emitted from the light source to be emitted from the light emitting port in such a manner that an emission direction of the light emitted from the light emitting port is variable. The control unit controls the light source and the emitting unit to switch between a first projection mode and a second projection mode. When the image projecting apparatus is placed on a horizontal plane, the emission direction is a front direction of the light emitting port or obliquely upward with respect to the horizontal plane in the first projection mode, and the emission direction is obliquely downward with respect to the horizontal plane in the second projection mode.

18 Claims, 16 Drawing Sheets

(51) Int. Cl.
  *G03B 21/14* (2006.01)
  *H04N 9/31* (2006.01)
  *H04M 1/02* (2006.01)
  *G02B 26/08* (2006.01)
  *G02B 27/09* (2006.01)

(52) U.S. Cl.
  CPC ......... *G02B 26/0833* (2013.01); *H04N 9/3173* (2013.01); *H04N 9/3129* (2013.01); *G02B 27/0977* (2013.01); *H04N 9/3185* (2013.01); *H04N 9/3194* (2013.01); *G02B 26/08* (2013.01); *G03B 21/142* (2013.01); *H04M 2250/54* (2013.01); *H04N 9/3197* (2013.01)
  USPC ................ 353/70; 353/85; 353/101

(56) References Cited

U.S. PATENT DOCUMENTS

| | | | | |
|---|---|---|---|---|
| 6,431,711 | B1 * | 8/2002 | Pinhanez | 353/69 |
| 7,111,948 | B2 * | 9/2006 | Lee et al. | 353/119 |
| 7,134,080 | B2 * | 11/2006 | Kjeldsen et al. | 715/730 |
| 7,284,866 | B2 * | 10/2007 | Buchmann | 353/42 |
| 7,658,498 | B2 * | 2/2010 | Anson | 353/69 |
| 7,880,948 | B2 | 2/2011 | Yamada | |
| 7,905,607 | B2 * | 3/2011 | Takatsu et al. | 353/70 |
| 2002/0105623 | A1 * | 8/2002 | Pinhanez | 353/69 |
| 2003/0038928 | A1 * | 2/2003 | Alden | 353/122 |
| 2004/0141157 | A1 * | 7/2004 | Ramachandran et al. | 353/70 |
| 2007/0247599 | A1 | 10/2007 | Kadowaki et al. | |
| 2009/0207380 | A1 * | 8/2009 | Aruga | 353/20 |

FOREIGN PATENT DOCUMENTS

| | | |
|---|---|---|
| JP | 2007096542 A | 4/2007 |
| WO | 2007043577 A1 | 4/2007 |
| WO | 2009041342 A1 | 4/2009 |
| WO | 2009057522 A1 | 5/2009 |

OTHER PUBLICATIONS

Office Action mailed Oct. 15, 2013, corresponds to Japanese patent application No. 2009-223505.

* cited by examiner

↑
A

↑
B

IMAGE PROJECTING APPARATUS HAVING FUNCTION OF CHANGING LIGHT EMISSION DIRECTION FOR EMITTING OBLIQUELY INCLINED LIGHT

CROSS-REFERENCE TO RELATED APPLICATION

This application is a National Stage of PCT international application Ser. No. PCT/JP2010/066841 filed on Sep. 28, 2010 which designates the United States, and which is based upon and claims the benefit of priority from Japanese Patent Application No. 2009-223505, filed on Sep. 28, 2009.

FIELD

The present disclosure relates to an image projecting apparatus that projects an image.

BACKGROUND

As a conventional device that projects an image to a wall surface or a screen, a so-called projector is used. A mainstream of the projector is a so-called stationary type device which is supplied with power from a commercial power supply and is used while being fixed to a predetermined location. The stationary type projector projects, in its fixed state, an image to a given portion of the wall surface or to the screen.

Recently, on the other hand, a mobile projector, compact in size and easy to carry, is proposed as the projector. For example, Patent Literature 1 describes a mobile terminal with a projector function that includes an upper cabinet, a lower cabinet, and a hinge for mutually pivotally connecting the upper cabinet and the lower cabinet, and also includes a projector having a lens and a light source.

CITATION LIST

Patent Literature

Patent Literature 1: Japanese Patent Application Laid-Open No. 2007-96542

TECHNICAL PROBLEM

The stationary type projector and even the mobile projector are configured based on an assumption that they emit light in a perpendicular direction with respect to an emission plane of the light to project an image to a plane facing the emission plane. In recent years, because user's needs have become diversified, a usage pattern meeting the user's needs has also been required for the projector. For the foregoing reasons, there is a need for a usage pattern other than the usage pattern in which an image is projected to a plane facing an emission plane in an image projecting apparatus that projects an image to a projection target.

SUMMARY

According to an aspect, an image projecting apparatus that projects an image includes: a light source for outputting light to form the image, the light source being capable of changing output of the light; an emitting unit for causing the light emitted from the light source to be emitted from a light emitting port in such a manner that an emission direction of the light emitted from the light source can be varied; and a control unit for controlling the light source and the emitting unit to control a projection state of the image to be projected. The control unit switches between a first projection mode in which the emission direction of the light emitted from the light emitting port, when the image projecting apparatus is placed on a horizontal plane, is a front direction of the light emitting port or obliquely upward with respect to the horizontal plane and a second projection mode in which the emission direction of the light emitted from the light emitting port, when the image projecting apparatus is placed on the horizontal plane, is obliquely downward with respect to the horizontal plane.

According to another aspect, an image projecting apparatus that projects an image includes: a light source for outputting laser light to form the image, the light source being capable of changing output of the laser light; an emitting unit that for causing the laser light emitted from the light source to be emitted from a light emitting port in such a manner that an emission direction of the laser light emitted from the light source can be varied; and a control unit for controlling the light source and the emitting unit to control a projection state of the image to be projected. The control unit switches between a first projection mode in which the emission direction of the laser light emitted from the light emitting port, when the image projecting apparatus is placed on a horizontal plane, is a direction facing the light emitting port or obliquely upward with respect to the horizontal plane and a second projection mode in which the emission direction of the laser light emitted from the light emitting port, when the image projecting apparatus is placed on the horizontal plane, is obliquely downward with respect to the horizontal plane.

According to another aspect, when executing the second projection mode, the control unit executes control for adjusting so that a shape of a laser light, which is formed on a virtual plane orthogonal to the emission direction of the laser light emitted from the light emitting port when the laser light emitted from the light emitting port is projected to the virtual plane, is a laterally long shape whose length in a longitudinal direction orthogonal to a lateral direction is shorter than a length thereof in the lateral direction parallel to the horizontal plane.

According to another aspect, the control unit executes the control for the adjustment when the image projecting apparatus is placed on the horizontal plane.

According to another aspect, the control unit executes the control for the adjustment when a length of the image in a direction parallel to an axis as a virtual optical axis, which is orthogonal to an emission plane of the light emitting port and is projected onto the image projected by the emitting unit, is longer than a length in a direction orthogonal to the virtual optical axis.

According to another aspect, the control unit adjusts a first light and a second light emitted to a side nearer the light emitting port than the first light, of a plurality of lights emitted to form one image in the second projection mode, in such a manner that a shape of the first light is laterally longer than a shape of the second light in a case where the shapes on the respective virtual plane are compared each other.

According to another aspect, the control for the adjustment is implemented by changing a height-to-width ratio of the light emitting port.

Preferably, the control unit changes the emission direction of light emitted from the light source so that a plurality of pixels that constitute the image formed by the laser light emitted from the light emitting port are arranged with distances between adjacent pixels in a first direction equal to each other and with distances between adjacent pixels in a second direction orthogonal to the first direction equal to each other.

According to another aspect, the control unit increases the output of the laser light output from the light source as an emission position of the laser light emitted from the light emitting port is farther away from the light emitting port.

According to another aspect, the image projecting apparatus further includes a distance measuring unit for measuring a distance from the image projecting apparatus to an image projection target. The control unit inclines the emission direction of the laser light emitted from the light emitting port toward a side of the light emitting port with an increase in the distance.

According to another aspect, an image projecting apparatus that projects an image includes: a light source for outputting light to form an image, the light source being capable of changing output of the light; an emitting unit for causing the light emitted from the light source can be emitted from a light emitting port in such a manner that an emission direction of the light emitted from the light source can be varied; and a control unit for controlling the light source and the emitting unit to control a projection state of an image to be projected. When a projection mode, in which an emission direction of light emitted from the light emitting port is obliquely downward with respect to a horizontal plane if the image projecting apparatus is place on the horizontal plane, is executed, the control unit changes the emission direction of the light emitted from the light source so that distances in a first direction between a plurality of pixels constituting an image formed by the light emitted from the light emitting port are equal to each other and distances between the plurality of pixels in a direction orthogonal to the first direction are equal to each other.

According to another aspect, the control unit executes control for adjusting so that a shape of a laser light, which is formed on a virtual plane orthogonal to the emission direction of the light emitted from the light emitting port when the light emitted from the light emitting port is projected to the virtual plane, is a laterally long shape whose length in a longitudinal direction orthogonal to a lateral direction is shorter than a length thereof in the lateral direction parallel to the horizontal plane.

Advantageous Effects of Invention

The present invention can provide a usage pattern other than the usage pattern in which an image is projected to a plane facing the emission plane in the image projecting apparatus that projects an image to a projection target.

DESCRIPTION OF EMBODIMENTS

The present invention will be explained in detail below with reference to the drawings. It should be noted that the present invention is not limited by the following explanation. In addition, the components in the explanation below include those which are easily thought of by persons skilled in the art, those which are substantially equivalents, and those in a scope of so-called equivalents. In the following, a mobile phone with a projector will be discussed as one example of the image projecting apparatus, however, a target to which the present invention is applied is not limited to the mobile phones, and, therefore, the present invention is also applicable to, for example, PHSs (Personal Handy-phone Systems), PDAs (Personal Digital Assistants), portable navigation devices, notebook computers, gaming devices, etc.

Figure 1:
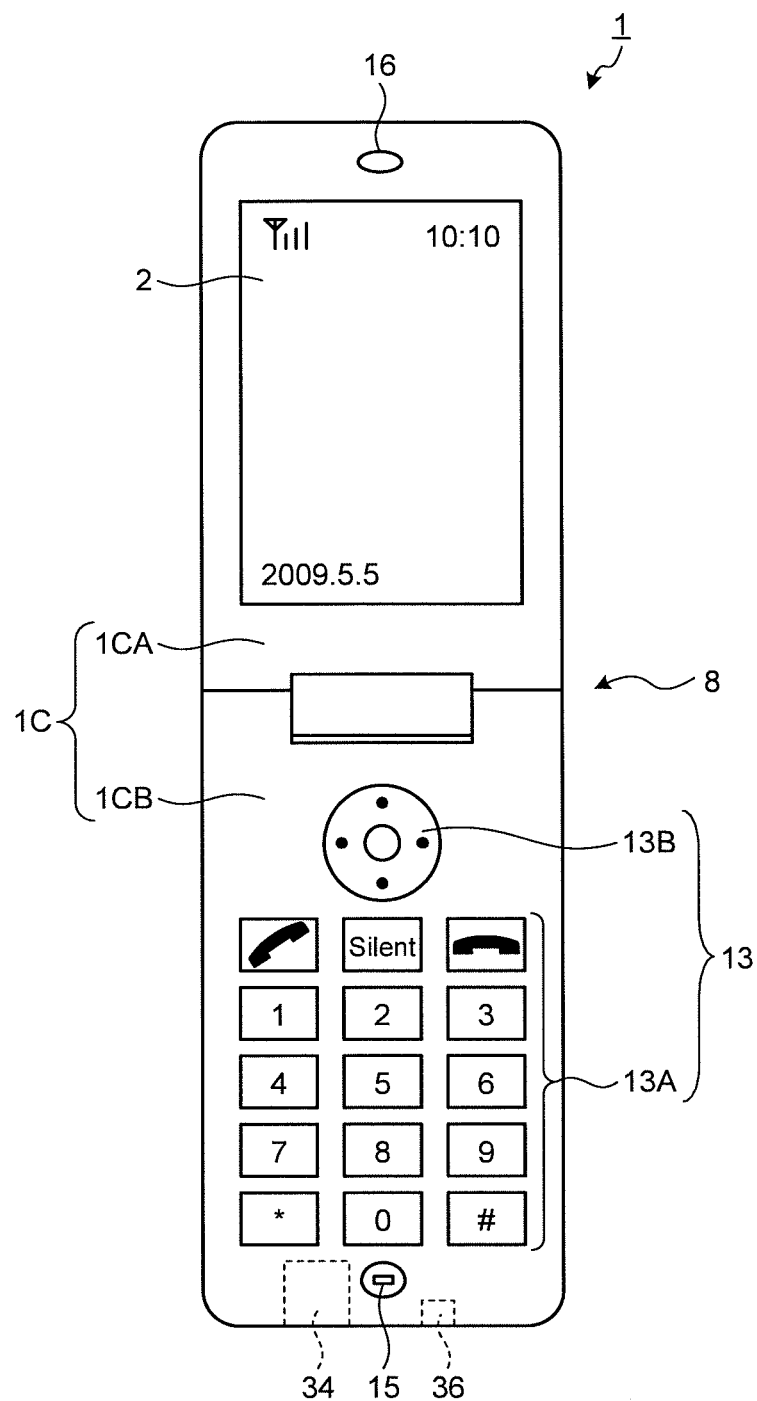
FIG. 1 is a diagram illustrating a schematic configuration of an image projecting apparatus according to a present embodiment.
Figure 2:
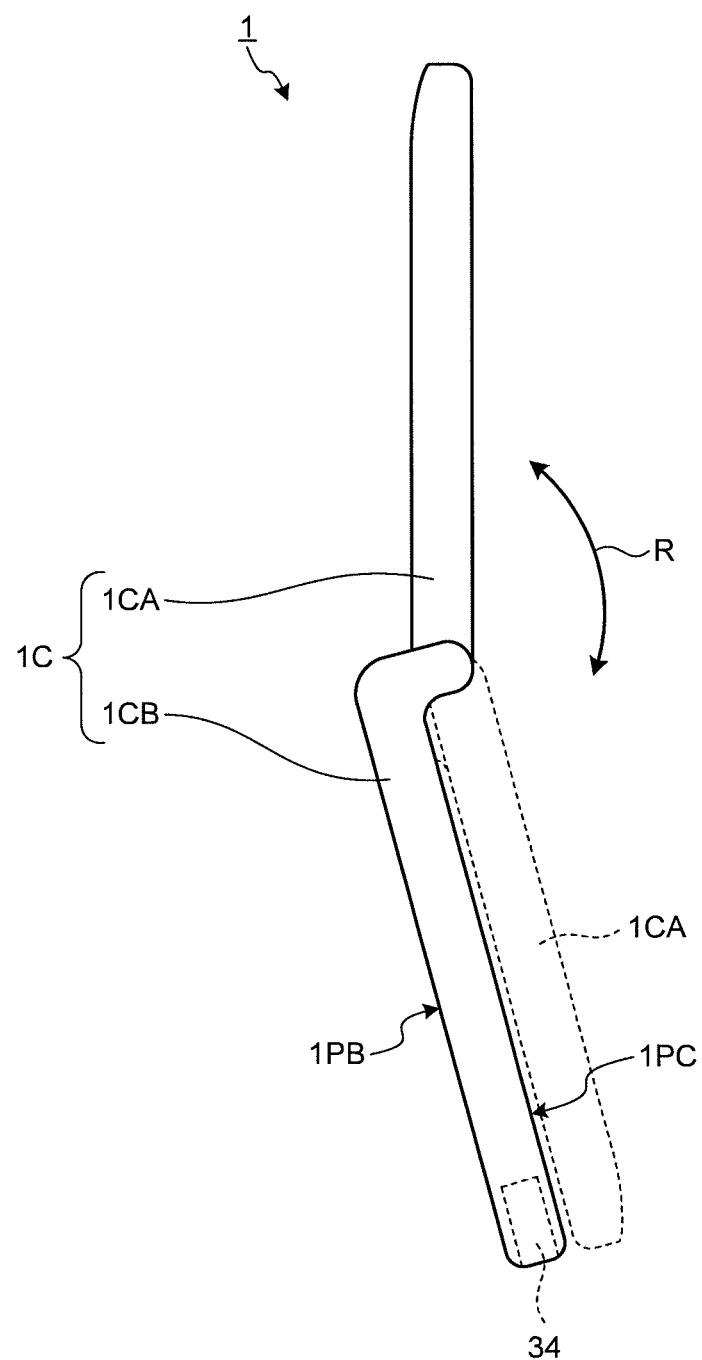
FIG. 2 is a diagram illustrating a schematic configuration of the image projecting apparatus according to the present embodiment.

FIG. 1 and FIG. 2 are diagrams illustrating a schematic configuration of the image projecting apparatus according to the present embodiment. The image projecting apparatus according to the present embodiment is a mobile phone 1 with a projector 34 as illustrated in FIG. 1 and FIG. 2. The mobile phone 1 includes a plurality of housings that form a housing 1C. Specifically, the housing 1C includes a first housing 1CA and a second housing 1CB which are openable/closable. That is, the mobile phone 1 has a folding housing. However, the housing of the mobile phone 1 is not limited to this configuration.

The first housing 1CA and the second housing 1CB are coupled to each other by a hinge mechanism 8 being a coupling portion. By coupling the first housing 1CA and the second housing 1CB with the hinge mechanism 8, both the first housing 1CA and the second housing 1CB can pivot around the hinge mechanism 8 so as to pivot in directions of separating from each other and a direction of approaching each other (directions indicated by arrow R in FIG. 2). When the first housing 1CA and the second housing 1CB pivot in the directions of separating from each other, the mobile phone 1 opens, and when the first housing 1CA and the second housing 1CB pivot in the direction of approaching each other, the mobile phone 1 closes to be in its folded state (state indicated by dotted line in FIG. 2).

The first housing 1CA includes a display 2 illustrated in FIG. 1 as a display unit. The display 2 displays a standby image when the mobile phone 1 awaits reception, and displays a menu image used to assist the operations of the mobile phone 1. The first housing 1CA also includes a receiver 16 being an output unit that outputs sound during a telephone call through the mobile phone 1.

The second housing 1CB includes a plurality of operation keys 13A used to enter a telephone number of an intended party and a text when mail is composed and the like, and also includes a direction and decision key 13B so as to easily perform selection and decision of a menu displayed on the display 2 and perform scrolling of a screen, or the like. The operation keys 13A and the direction and decision key 13B form an operating unit 13 of the mobile phone 1. The second housing 1CB also includes a microphone 15 being a sound acquiring unit that receives sound during a telephone call through the mobile phone 1. The operating unit 13 is provided on an operating surface 1PC of the second housing 1CB illustrated in FIG. 2. The face opposite to the operating surface 1PC is a back face 1PB of the mobile phone 1.

An antenna is internally provided in the second housing 1CB. The antenna is a transmitting and receiving antenna used for wireless communication, and is used for transmission and reception of radio waves (electromagnetic waves) related to telephone call and e-mail and so on between the mobile phone 1 and a base station. The second housing 1CB includes the microphone 15. The microphone 15 is disposed on the side of the operating surface 1PC of the mobile phone 1 illustrated in FIG. 2.

Provided on the opposite side of the hinge mechanism 8 of the second housing 1CB are the projector 34 being an image projector and a distance sensor 36 being a distance measuring unit that measures a distance from the mobile phone 1 to an image projection target of the projector 34. This configuration enables the projector 34 to project an image to a projection target. The light emitting port of the projector 34 is exposed to the outside of the second housing 1CB.

Figure 3:
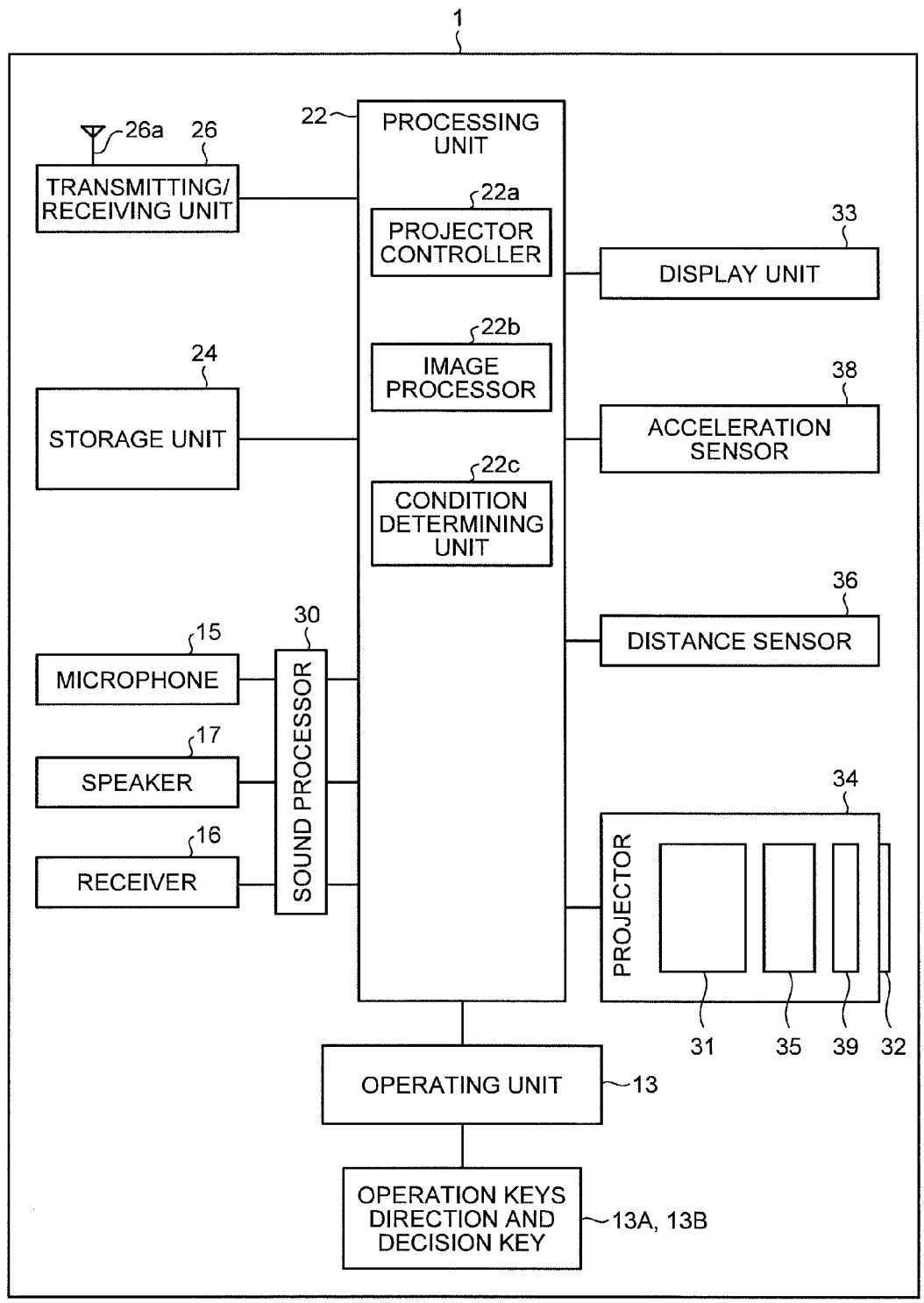
FIG. 3 is a block diagram illustrating a schematic configuration of functions of a mobile electronic device illustrated in FIG. 1 and FIG. 2.

FIG. 3 is a block diagram illustrating a schematic configuration of functions of the mobile electronic device illustrated in FIG. 1 and FIG. 2. As illustrated in FIG. 3, the mobile phone 1 includes a processing unit 22, a storage unit 24, a transmitting/receiving unit 26, the operating unit 13, a sound processor 30, a display unit 33, the projector 34, the distance sensor 36, and an acceleration sensor 38 being a movement detector. The processing unit 22 includes a function of integrally controlling an entire operation of the mobile phone 1. That is, the processing unit 22 controls the operations of the transmitting/receiving unit 26, the sound processor 30, and the display unit 33 and the like so that various processes of the mobile phone 1 are executed in an appropriate procedure according to an operation through the operating unit 13 and software stored in the storage unit 24 of the mobile phone 1.

The various processes of the mobile phone 1 include, for example, voice phone conversation over a line switching network, composition and transmission/reception of e-mail, and browsing of Web (World Wide Web) sites on the Internet. The operations of the transmitting/receiving unit 26, the sound processor 30, and the display unit 33 and the like include, for example, signal transmission/reception by the transmitting/receiving unit 26, sound input/output by the sound processor 30, and image display by the display unit 33.

The processing unit 22 executes processes based on programs (for example, an operating system program and application programs) stored in the storage unit 24. The processing unit 22 includes, for example, MPU (Micro Processing Unit) and executes the various processes of the mobile phone 1 according to the procedure instructed by the software. That is, the processing unit 22 sequentially reads operation codes from the operating system program and the application programs or the like stored in the storage unit 24 to perform the processes.

The processing unit 22 has a function of executing a plurality of application programs. The application program executed by the processing unit 22 includes a plurality of application programs such as an application program for controlling the drive of the projector 34 and the distance sensor 36, an application program for reading various image files (image information) from the storage unit 24 and decoding them, and an application program for causing the display unit 33 to display an image obtained by being decoded or for causing the projector 34 to project the image.

In the present embodiment, the processing unit 22 includes a projector controller (control unit) 22a, an image processor 22b, and a condition determining unit 22c. Functions respectively provided in the projector controller 22a, the image processor 22b, and the condition determining unit 22c are implemented by tasks that are assigned by the control unit of the processing unit 22 and are performed by hardware resources including the processing unit 22 and the storage unit 24. The task mentioned here represents a unit of process that cannot be simultaneously executed with some other processes, of all processes performed by the application software or of processes performed by the same application software. The projector controller 22a controls the projector 34. The image processor 22b generates an image to be projected by the projector 34 and an image to be displayed on the display unit 33. The condition determining unit 22c determines branching of control conditions.

The storage unit 24 stores therein software and data used for processes executed by the processing unit 22, and also stores therein a task for activating an application program that controls the drive of the projector 34 and the distance sensor 36 and a task for activating an image processing program. The storage unit 24 stores therein, in addition to the tasks, for example, sound data through communications or downloaded, software used by the processing unit 22 to control the storage unit 24, an address book in which phone numbers of intended parties and mail addresses and the like are described and managed, a sound file such as a dial tone and a ring tone, and temporary data used in the processing process of the software.

The computer program and the temporary data used in the processing process of the software are temporarily stored in a work area of the storage unit 24 assigned thereto by the processing unit 22. The storage unit 24 includes, for example, a nonvolatile storage device (nonvolatile semiconductor memory such as ROM: Read Only Memory, a hard disk drive, and so on) and a readable/writable storage device (e.g., SRAM: Static Random Access Memory, and DRAM: Dynamic Random Access Memory).

The transmitting/receiving unit 26 includes an antenna 26a, and establishes a wireless signal path using CDMA (Code Division Multiple Access) system or so with a base station via a channel assigned by the base station to perform telephone communication and information communication with the base station. The operating unit 13 includes the operation keys 13A assigned with various functions such as a power key, a talk key, numeric keys, character keys, direction keys, a decision key, and a send key; and the direction and decision key 13B. When any of the keys is input through a user's operation, the operating unit 13 generates a signal corresponding to the content of the operation. The generated signal is input to the processing unit 22 as an instruction of the user.

The sound processor 30 performs processes of a sound signal input to the microphone 15 and of a sound signal output from the receiver 16 and a speaker 17. The display unit 33 has the display 2, and displays a video according to video data and an image according to image data supplied from the processing unit 22 on a display panel. The display unit 32 may include a sub-display in addition to the display 2.

The projector 34 includes a light source and an optical system for switching whether light emitted from the light source is to be projected based on the image data. In the present invention, the projector 34 includes a light source 31, an emitting unit (drawing device) 35 being the optical system, a light-shape changing unit 39, and a light emitting port 32. The light source 31 emits visible laser light. The light in a visible light region is a light whose short wavelength side is from 360 nm to 400 nm or more, and whose long wavelength side is from 760 nm to 830 nm or less. In the present embodiment, the light source 31 emits lights of three colors of R (Red), G (Green), and B (Blue).

The emitting unit 35 combines the lights of three colors emitted from the light source 31, and emits the combined lights to the image projection target. The emitting unit 35 includes a switching element for switching whether the light emitted from the light source 31 is caused to pass therethrough, and a mirror for causing the light having passed through the switching element to be raster-scanned. The emitting unit 35 changes an angle of the laser light emitted from the light source 31 by the mirror and scans the laser light on the image projection target, to thereby project the image generated by the image processor 22b to the image projection target.

As the mirror, for example, an MEMS (Micro Electro Mechanical System) mirror is used. The MEMS mirror uses a piezoelectric element to drive the mirror, and scans the visible light emitted from the light source 31 to generate a visible image. In this case, an angle of the light emitted from the light source is changed by the mirror to scan the light emitted from the light source over the whole area of the image projection target, so that the visible image can be projected to the image projection target. As explained above, the projector 34 is a scanning type projector. The configuration of the projector 34 is not limited to the configuration in which the laser is used as the light source. For example, the projector 34 may be a projector that includes a halogen light, an LED, or an LD as the light source 31, and an LCD (Liquid Crystal Display) or a DMD (Digital Micro-mirror Device) as the emitting unit 35 of the optical system.

Figure 4:
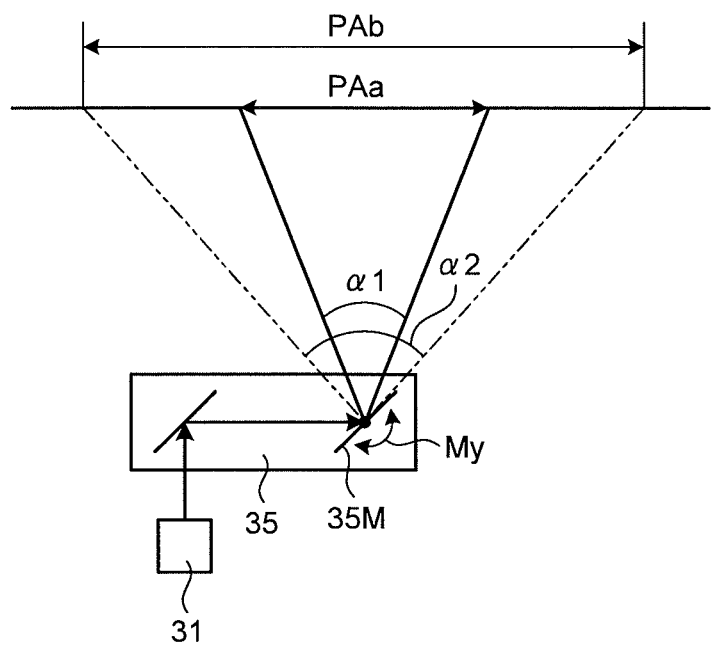
FIG. 4 is a schematic diagram for explaining an operation of an emitting unit.
Figure 5:
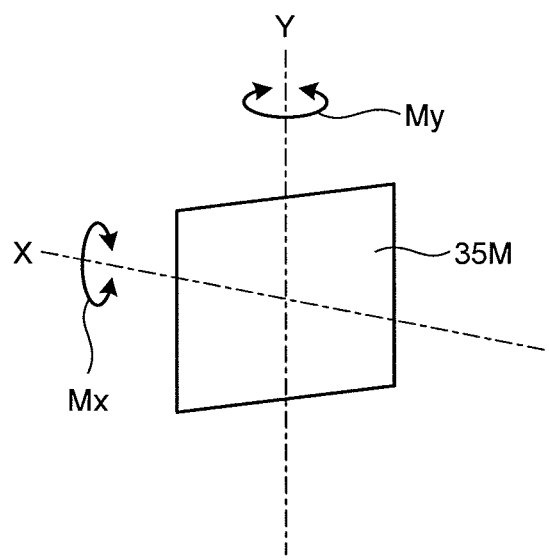
FIG. 5 is a schematic diagram for explaining a movement of a mirror that forms the emitting unit.

FIG. 4 is a schematic diagram for explaining an operation of the emitting unit. FIG. 5 is a schematic diagram for explaining a movement of the mirror that forms the emitting unit. In the present embodiment, the projection area of the projector 34 is changed by changing an operation range of a mirror 35M that forms the emitting unit 35. The mirror 35M changes an angle of a laser light emitted from the light source 31 and swings around the X axis and the Y axis (directions indicated by arrows Mx and My) as illustrated in FIG. 5, to scan the laser light on the image projection target. FIG. 4 depicts a state where swinging of the mirror 35M around the Y axis (direction indicated by arrow My in FIG. 4) causes the laser light to be scanned in the X-axis direction. By changing the angle (swing angle) at which the mirror 35M swings from $\alpha 1$ to $\alpha 2$ ($\alpha 1 < \alpha 2$), a scan range of the laser light on the image projection target is changed from PAa to PAb.

Figure 6:
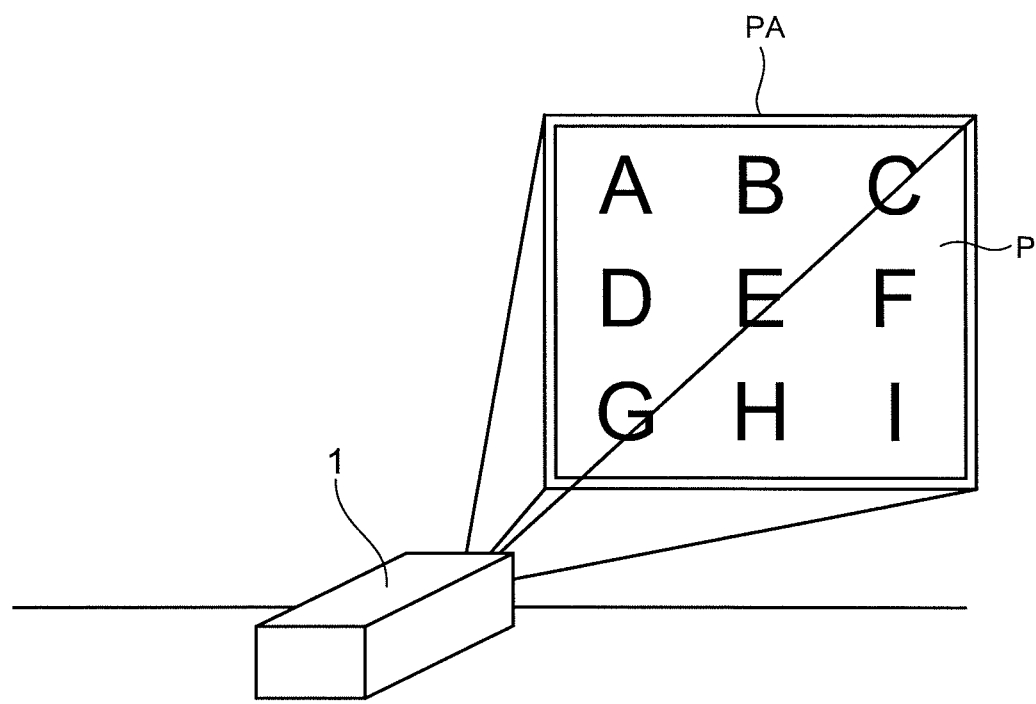
FIG. 6 is an explanatory diagram illustrating a state in which an image is displayed by a projector of the mobile electronic device illustrated in FIG. 1.

FIG. 6 is an explanatory diagram illustrating a state in which an image is displayed by the projector of the mobile electronic device illustrated in FIG. 1. As explained above, the light emitting port 32 of the projector 34 is exposed to the outside of the housing of the mobile phone 1. The mobile phone 1 projects an image from the projector 34 and thereby enables to project an image P to a predetermined area (projection area) PA, as illustrated in FIG. 6, of the image projection target (e.g., a wall surface and a floor) at a location facing an image projection plane of the projector 34.

Figure 7:
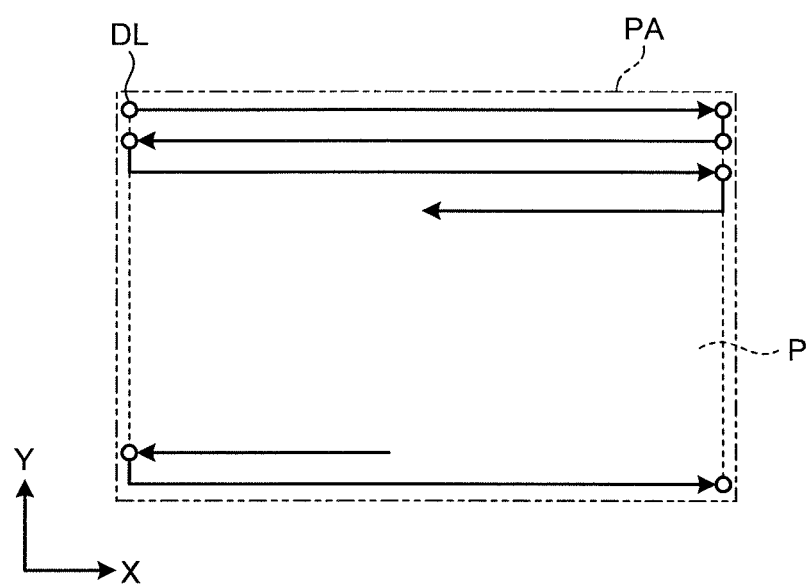
FIG. 7 is a schematic diagram illustrating a drawing method in a scanning type projector.

FIG. 7 is a schematic diagram illustrating a drawing method in a scanning type projector. The emitting unit 35 illustrated in FIG. 3 scans a spot (light spot) D of the laser light emitted from the light source 31 of the projector 34 along the X direction and the Y direction, so that the image P is drawn within the projection area PA of the projector 34. At this time, a light spot DL is scanned in a reciprocating manner along the X direction, and is scanned in one direction along the Y direction. If the image P to be drawn by the projector 34 is a rectangle, scanning of the light spot DL is started from one of corners, and the light spot DL scans over the whole area of the image P along the X direction and the Y direction. Thereby, one drawing is finished and one image P is drawn.

Figure 8A:
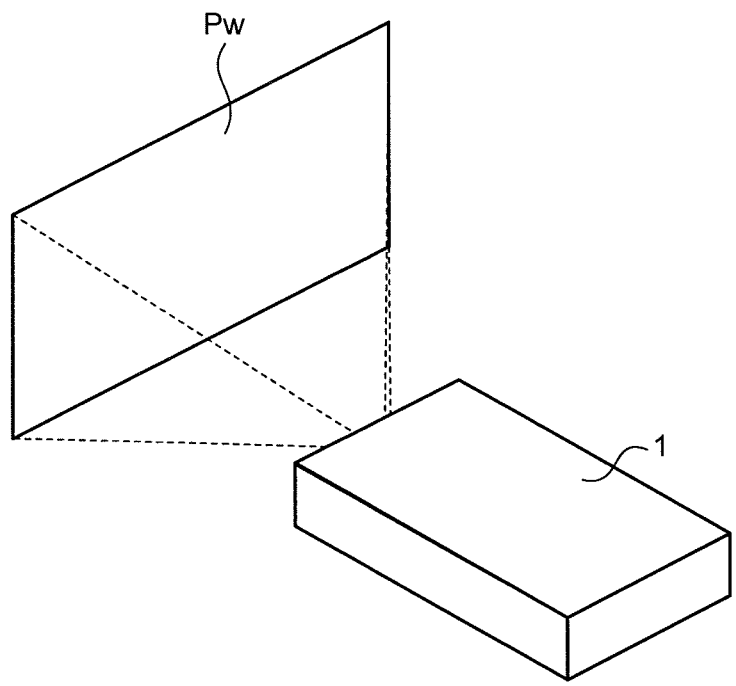
FIG. 8A is an explanatory diagram of a first projection mode provided in the image projecting apparatus according to the present embodiment.
Figure 8B:
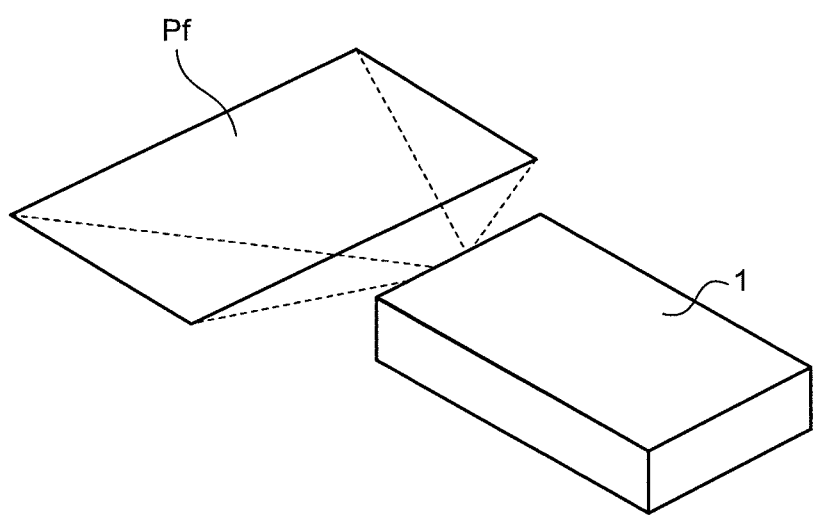
FIG. 8B is an explanatory diagram of a second projection mode provided in the image projecting apparatus according to the present embodiment.
Figure 9A:
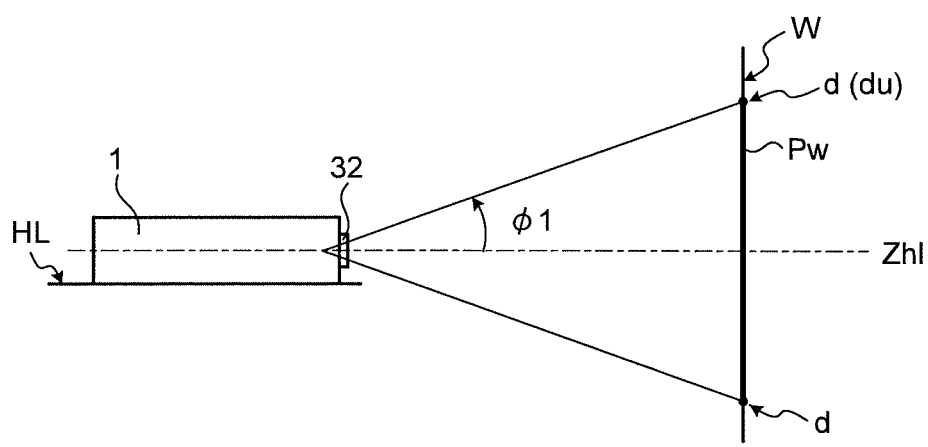
FIG. 9A is an explanatory diagram of the first projection mode provided in the image projecting apparatus according to the present embodiment.
Figure 9B:
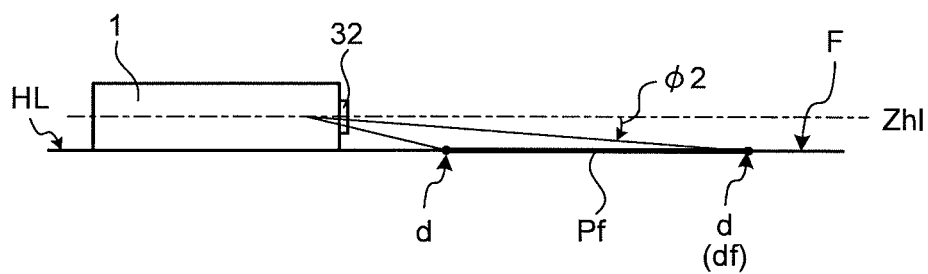
FIG. 9B is an explanatory diagram of the second projection mode provided in the image projecting apparatus according to the present embodiment.

FIG. 8A, FIG. 8B, FIG. 9A, and FIG. 9B are explanatory diagrams of projection modes provided in the image projecting apparatus according to the present embodiment. FIG. 8A and FIG. 9A depict a first projection mode, and FIG. 8B and FIG. 9B depict a second projection mode. The mobile phone 1 being the image projecting apparatus according to the present embodiment has at least two modes (projection modes) to project an image to the projection target, that is, at least two modes: the first projection mode and the second projection mode. The first projection mode is a mode, as illustrated in FIG. 8A, to project an image Pw to, for example, a projection target (e.g., wall) located at the front with respect to the light emitting port 32 of the projector 34 provided in the mobile phone 1. The second projection mode is a mode, as illustrated in FIG. 8B, to project an image Pf to, for example, a projection target (e.g., floor) located obliquely downward with respect to the light emitting port 32 of the projector 34 provided in the mobile phone 1.

In the first projection mode, as illustrated in FIG. 9A, an emission direction of the light emitted from the light emitting port 32, when the mobile phone 1 is placed on a horizontal plane HL, is a front direction of the light emitting port 32 or obliquely upward with respect to the horizontal plane. Thereby, the projector 34 projects, for example, the image Pw to a wall W at the front with respect to the light emitting port 32. In the second projection mode, as illustrated in FIG. 9B, an emission direction of the light emitted from the light emitting port 32, when the mobile phone 1 is placed on the horizontal plane HL, is obliquely downward with respect to the horizontal plane HL. Thereby, the projector 34 projects the image Pf to, for example, a floor F where the projector 34 is placed. The horizontal plane HL is a plane orthogonal to the vertical direction (direction of gravity).

The first projection mode is a state, as illustrated in FIG. 9A, where at least part of pixels d forming the image Pw projected to a projection target are projected toward an upper side from the horizontal plane HL (opposite side to the vertical direction). That is, as illustrated in FIG. 9A, the first projection mode is a state where at least part of the pixels d forming the image Pw projected to the projection target are projected toward an upper side with respect to a line (horizontal line) Zhl parallel to the horizontal plane HL. In this case, an angle φ1 between the horizontal line Zhl and a line segment connecting a pixel d (du) projected to a highest position, among the pixels d forming the image Pw, and the light emitting port 32 becomes 0 degree or more toward the upper side from the horizontal line Zhl.

The second projection mode is a state, as illustrated in FIG. 9B, where all pixels d forming the image Pf projected to a projection target are projected to a lower side with respect to the horizontal plane HL (vertical direction side). That is, as illustrated in FIG. 9B, the second projection mode is a state where all the pixels d forming the image Pf projected to the projection target are projected to a lower side with respect to the line (horizontal line) Zhl parallel to the horizontal plane HL. In this case, an angle φ2 between the horizontal line Zhl and a line segment connecting a pixel d (df) projected to a farthest position from the light emitting port 32, among the pixels d forming the image Pf, and the light emitting port 32 becomes larger than 0 degree toward the lower side from the horizontal line Zhl.

In this manner, because the mobile phone 1 has at least two modes: the first projection mode and the second projection mode, the projector 34 can project an image not only to a screen and a wall but also to a placing surface of a desk, a floor, and the like, where the mobile phone 1 is placed. Thereby, convenience of the projector 34 provided in the mobile phone 1 is improved. In addition, an image can be projected to the placing surface of the mobile phone 1 or to a lower side from the placing surface with the mobile phone 1 kept placed on the desk or the like. Therefore, the mobile phone 1 does not need to be re-placed. In addition, the user does not have to direct the mobile phone 1 held by hand toward the lower side. As a result, the convenience of the projector 34 provided in the mobile phone 1 is further improved.

Moreover, in the second projection mode, as compared with the first projection mode, an angle between the light emitted from the light emitting port 32 of the projector 34 and the emission plane is small. Therefore, when an image of the same size is projected, volume of a three-dimensional shape (projection target space) formed by connecting the light emitting port 32 and a projected image is smaller in the second projection mode than that in the first projection mode. As a result, it is possible to reduce the possibility that any object (e.g., pointer stick or person) may enter the three-dimensional shape, and this leads to reduction in the possibility in which the object may block the light emitted from the light emitting port 32 to thereby form shade on the projected image. In this manner, the image projecting apparatus according to the present embodiment can provide a usage pattern other than the usage pattern in which an image is projected to a plane facing the emission plane.

The projector controller 22a may switch the mode from the first projection mode to the second projection mode at the time of turning, upside down, the mobile phone 1 which is projecting an image in the first projection mode while being placed on a desk or the like, as a trigger. If the mobile phone 1 is turned upside down, this can be detected by, for example, the acceleration sensor 38. By this setting, the projection modes can be switched without a particular input, and the projection modes can also be switched so as to match the user's feeling.

Figure 10A:
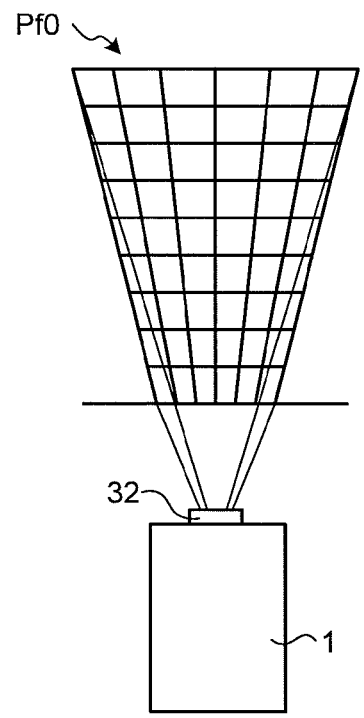
FIG. 10A is a schematic diagram illustrating a state in which an image is projected in the second projection mode.
Figure 10B:
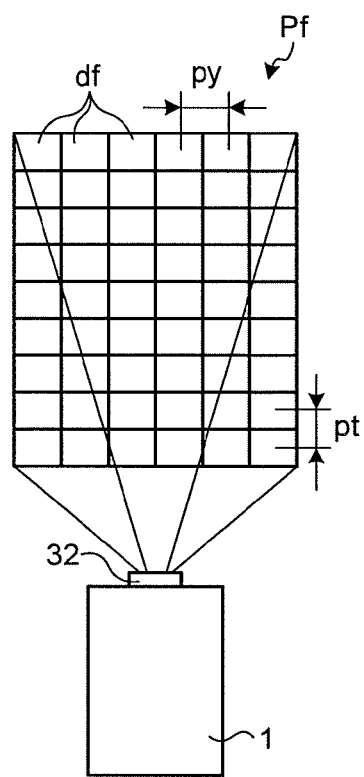
FIG. 10B is a schematic diagram illustrating a state in which an image is projected in the second projection mode.
Figure 11A:
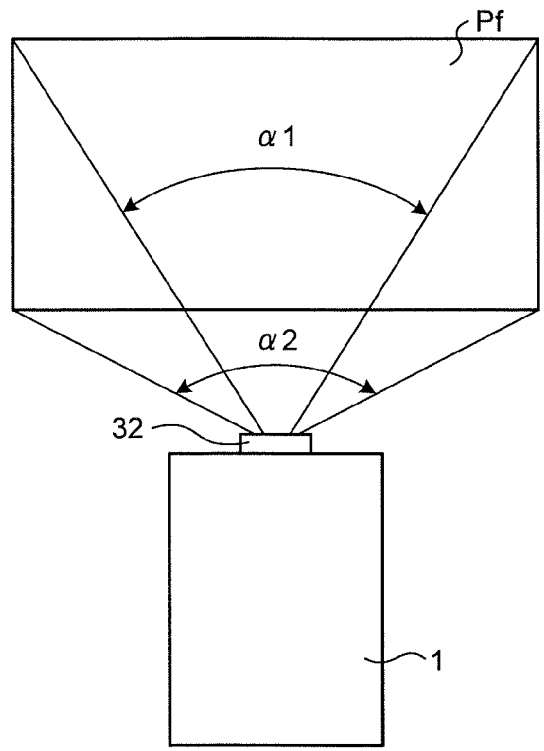
FIG. 11A is a schematic diagram for explaining control of a swing angle of the mirror to achieve the second projection mode.

FIG. 10A and FIG. 10B are schematic diagrams illustrating a state in which an image is projected in the second projection mode. FIG. 11A is a schematic diagram for explaining control of a swing angle of the mirror to achieve the second projection mode. If the mobile phone 1 is placed on a desk or so and light is simply emitted from the light emitting port 32 of the projector 34 toward a placing surface for the mobile phone 1, a projected image Pf0 becomes a trapezoidal shape of which side close to the emitting port of the mobile phone 1 is short as illustrated in FIG. 10A. In the second projection mode, a rectangular image Pf needs to be projected as illustrated in FIG. 10B.

Therefore, the projector controller 22a that constitutes the processing unit 22 of the mobile phone 1 controls the swing angle of the mirror 35M that constitutes the emitting unit 35 of the projector 34, as illustrated in FIG. 4, according to a distance from the light emitting port 32 of the projector 34. Thereby, the trapezoidal shape is corrected in the second projection mode, and the rectangular image Pf is projected from the projector 34. As illustrated in FIG. 11A, the swing angle is controlled so as to decrease with an increase in the distance from the light emitting port 32 of the projector 34. That is, α1<α2.

In this case, as illustrated in FIG. 10B, the projector controller 22a controls the projector 34 to draw an image so that, of a plurality of pixels df forming the image Pf formed by the light emitted from the light emitting port 32, distances py between adjacent pixels in a first direction are equal to each other, and distances pt between adjacent pixels in a second direction orthogonal to the first direction are equal to each other. In this manner, distortion and inconsistency between pixels in an image to be projected is suppressed, so that a decrease in image quality can be suppressed.

The first direction is, for example, a lateral direction, which is a scanning direction of the projector 34. The second direction is, for example, a longitudinal direction, which is a direction (sub-scanning direction) orthogonal to the scanning direction of the projector 34. The longitudinal direction (vertical) is a direction parallel to an axis as a virtual optical axis, explained later, projected onto the image Pf, and the lateral direction (horizontal) is a direction orthogonal to the longitudinal direction. The projector controller 22a may further control the distances so that the distance py between adjacent pixels in the first direction and the distance pt between adjacent pixels in the second direction are equal to each other.

In the present embodiment, because it is assumed in the second projection mode that an image is projected to the placing surface where the mobile phone 1 is placed, the original rectangular image is largely distorted to become a trapezoidal shape before the shape of the projected image is corrected. In this case, since the projector using the laser light dose not have to adjust the focus, it is easy to achieve the second projection mode. Particularly, the scanning type projector projects the light from a point light source to form an image, and can therefore easily correct the shape of the image in the second projection mode by changing its projection position. In the present embodiment, the projector 34 uses the scanning type in which the laser is used as the light source, and therefore is preferable for achievement of the second projection mode. In the present embodiment, the scanning type projector using the laser as the light source is used as an example, however, any type other than the scanning type using the laser as the light source is not excluded.

Figure 11B:
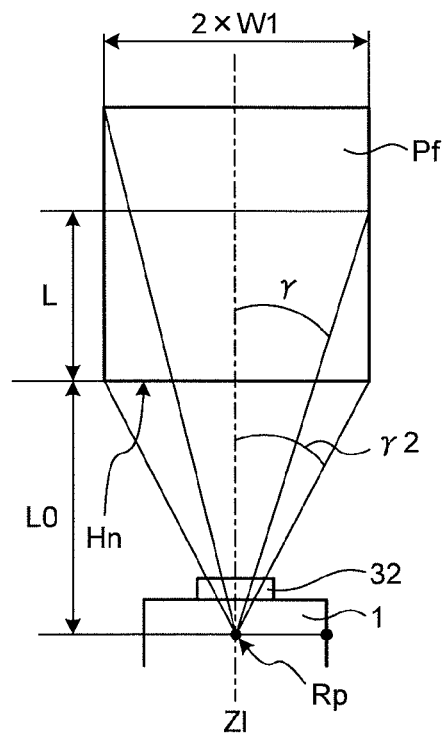
FIG. 11B is a schematic diagram for explaining an example of calculating the swing angle.

FIG. 11B is a schematic diagram for explaining an example of calculating the swing angle. A distance from a light output point Rp to an edge Hn of the image Pf on the light emitting port 32 side is set as L0, a distance from the edge Hn to an arbitrary position inside the image Pf is set as L, a half value of a swing angle along the edge Hn is set as γ2, a half value of the swing angle along the arbitrary position inside the image Pf is set as γ, and a width of the image Pf in the lateral direction (direction orthogonal to the axis as the virtual optical axis Zl, explained later, projected onto the image Pf) is set as 2×W1. In this case, Equation (1) and Equation (2) hold. Here, the light output point Rp is a point at which the laser light emitted from the light source 31 hits the mirror 35M and is reflected thereby as illustrated in FIG. 4, and in the present embodiment, this point is on the inner side of the mobile phone 1 deeper than the light emitting port 32.

$$W1 = (L0+L) \times \tan \gamma \quad (1)$$

$$W1 = L0 \times \tan \gamma 2 \quad (2)$$

Therefore, tan γ={tan γ2×L0/(L0+L)} holds. That is, $$\gamma = \tan^{-1}\{\tan \gamma 2 \times L0/(L0+L)\} \quad (3)$$

holds.

Supposing it is preset as an initial condition that a position to which the edge Hn of the image Pf is projected is how far from the light emitting port 32a when the mobile phone 1 is placed on a horizontal plane, a horizontal distance between the light emitting port 32 and the edge Hn is L0. W1 can be calculated by, for example, previously setting the size of the image to be projected, and therefore γ2 can be calculated from Equation (2). However, only L0 may be set and γ2 may be set as any value. If L0 and γ2 are determined, by giving a distance from the edge Hn to the arbitrary position inside the image Pf to Equation (3), a half value γ of the swing angle at the arbitrary position can be calculated. The swing angle along the edge Hn is 2×γ2 and the swing angle at the arbitrary position is 2×γ. The projector controller 22a determines the swing angle by executing the calculation in the second projection mode, and controls the mirror 35M based on the determined swing angle.

Figure 12A:
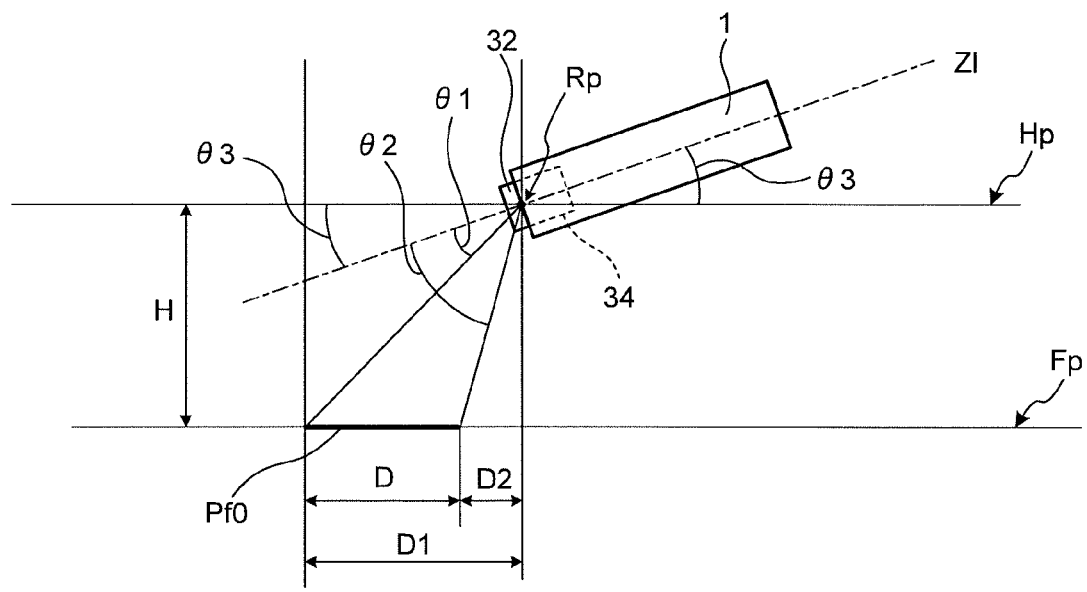
FIG. 12A is an explanatory diagram of a method of correcting an aspect ratio of an image projected in the second projection mode.
Figure 12B:
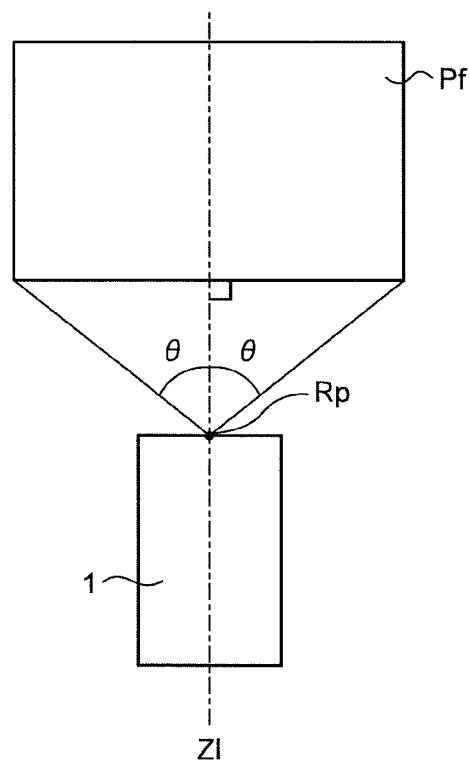
FIG. 12B is an explanatory diagram of the method of correcting an aspect ratio of an image projected in the second projection mode.
Figure 12C:
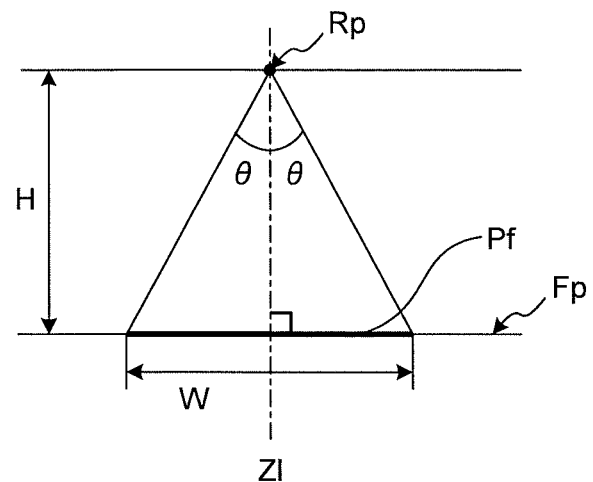
FIG. 12C is an explanatory diagram of the method of correcting an aspect ratio of an image projected in the second projection mode.

FIG. 12A to FIG. 12E are explanatory diagrams of a method of correcting an aspect ratio of an image projected in the second projection mode. FIG. 12A depicts an image Pf0 before the trapezoidal shape is corrected to a rectangular shape (hereinafter, called "pre-correction image Pf0" if necessary). FIG. 12B depicts a state in which the mobile phone 1 and the image Pf projected to a projection plane Fp are viewed from a direction orthogonal to the projection plane (e.g., the upper surface of a floor, a desk, or so) Fp of the pre-correction image Pf0 as illustrated in FIG. 12A. FIG. 12B and FIG. 12C depict an image Pf after its trapezoidal shape is corrected to a rectangular shape (hereinafter, called "post-correction image Pf" if necessary).

If the shape of the image to be projected is simply corrected from the trapezoidal shape to the rectangular shape, the aspect ratio of the original image varies. Therefore, the aspect ratio of an image to be projected is also adjusted according to an angle (projection angle) at which the projector 34 inclines the light toward the lower side in the second projection mode.

As illustrated in FIG. 12A, a narrow-angle of angles between the virtual optical axis Zl of the projector 34 and a line segment connecting the light output point Rp and an edge of the pre-correction image Pf0 on a farther side with respect to the light output point Rp is set as θ1, a narrow-angle of angles between the virtual optical axis Zl of the projector 34 and a line segment connecting the light output point Rp and an edge of the pre-correction image Pf0 on a nearer side with respect to the light output point Rp is set as θ2, and a narrow-angle of angles between a horizontal plane Hp and the virtual optical axis Zl is set as θ3. The angle θ3 is generally 0 degree. The horizontal plane Hp is a plane orthogonal to the vertical direction and intersecting with the light output point Rp of the projector 34. The virtual optical axis Zl is an axis passing through the light output point Rp and being perpendicular to the projection plane of the light emitting port 32. When the light (laser light) output from the light source 31 is reflected by the mirror 35M at a neutral position of the mirror 35M illustrated in FIG. 4 (position where the reflecting surface of the mirror 35M is inclined at 45 degrees from the virtual optical axis Zl), the light passes through the virtual optical axis Zl.

A horizontal distance between the light output point Rp and the edge of the pre-correction image Pf0 on the farther side with respect to the light output point Rp is set as D1, a horizontal distance between the light output point Rp and the edge of the pre-correction image Pf0 on the nearer side with respect to the light output point Rp is set as D2, a dimension of the pre-correction image Pf0 in a direction separating from the light emitting port 32 when viewed from a direction orthogonal to the projection plane Fp of the pre-correction image Pf0 is set as D (=D1−D2), and a vertical distance between the horizontal plane Hp and the projection plane Fp is set as H.

Figure 12D:
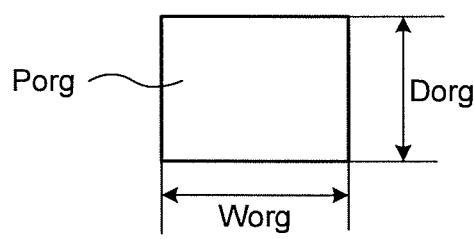
FIG. 12D is an explanatory diagram of the method of correcting an aspect ratio of an image projected in the second projection mode.
Figure 12E:
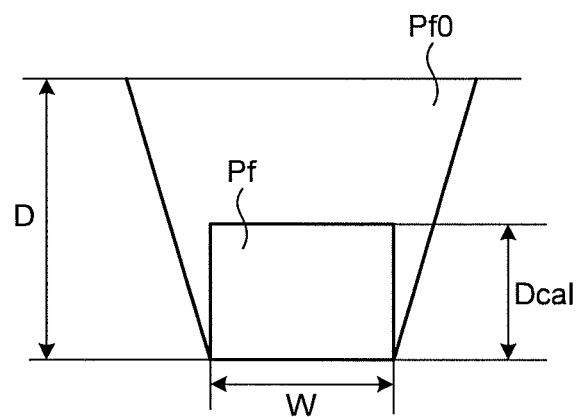
FIG. 12E is an explanatory diagram of the method of correcting an aspect ratio of an image projected in the second projection mode.

As illustrated in FIG. 12B, a half value of a swing angle of the mirror 35M (see FIG. 4) at the time of forming an edge of the post-correction image Pf on the light output point Rp side is set as θ. As illustrated in FIG. 12C, a length (width in the lateral direction) of the edge of the post-correction image Pf on the light output point Rp side in the direction orthogonal to the virtual optical axis Zl on the projection plane Fp is set as W. FIG. 12D illustrates an image (original image) Porg to be projected, of which length in the longitudinal direction is set as Dorg and of which width in the lateral direction is set as Worg. Dorg and Worg can be calculated from, for example, data for the original image Porg. FIG. 12E depicts the pre-correction image Pf0 and the post-correction image Pf, in which a length of the post-correction image Pf in the longitudinal direction is set as Dcal and a width thereof in the lateral direction is set as W.

From the relation as above, D can be calculated by Equation (4) and W can be calculated by Equation (5). Because the aspect ratio of the original image Porg and the aspect ratio of the post-correction image Pf become equal to each other, a relation of Equation (6) holds.

$$D=D1-D2=H/\{1/\tan(\theta1+\theta3)-1/\tan(\theta2+\theta3)\} \quad (4)$$

$$W=2\times H\times \tan\theta \quad (5)$$

$$\text{Worg:Dorg=W:Dcal} \quad (6)$$

From Equation (6), Dcal=W×Dorg/Worg is obtained, and, by further using Equation (5), $$Dcal=2\times H\times \tan\theta\times Dorg/Worg \quad (7)$$

is obtained.

The value θ3 can be calculated by using, for example, the acceleration sensor 38 illustrated in FIG. 3. Because the above-mentioned swing angle is 2×γ2, the value θ can be determined by previously setting to which location and in which size, with respect to the mobile phone 1, the post-correction image Pf is projected. Moreover, the value θ2 can be determined by previously setting to which location, with respect to the mobile phone 1, the post-correction image Pf is projected.

If H is calculated from the distance sensor 36 illustrated in FIG. 3, because the aspect ratio Dorg/Worg of the original image Porg is known, Dcal can be calculated by using Equation (7). By substituting the obtained Dcal in D of Equation (4) to solve unknown θ1, the post-correction image Pf can be projected while maintaining the aspect ratio Dorg/Worg of the original image Porg. In this manner, the post-correction image Pf can be projected using the same aspect ratio as that of the original image Porg even if the projection angle changes. In the example, θ1 is corrected according to Dcal, however, W may be adjusted so that the post-correction image Pf maintains the aspect ratio Dorg/Worg of the original image Porg while the value of D remains as it is.

Figure 13:
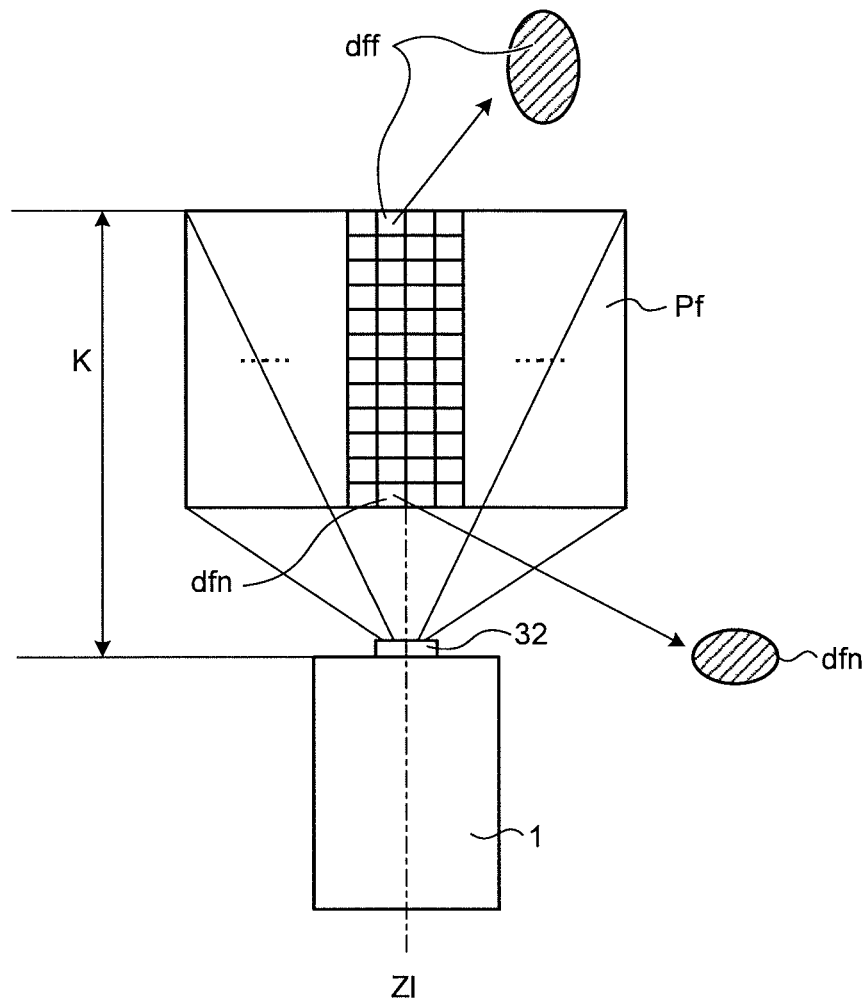
FIG. 13 is an explanatory diagram of a shape of a pixel in the second projection mode.

FIG. 13 is an explanatory diagram of a shape of a pixel in the second projection mode. FIG. 13 depicts a state in which the mobile phone 1 and the image Pf are viewed from the direction orthogonal to a projection plane (e.g., the upper surface of a floor, a desk, or so) of the image Pf. As explained above, in the second projection mode, the emission direction of the light emitted from the light emitting port 32 is obliquely downward with respect to the horizontal plane. Because of this, as illustrated in FIG. 13, a pixel dff of the image Pf at a position away from the light emitting port 32 is formed to a shape (vertically long shape) more elongated in a direction (pixel extending direction) of an axis as the optical axis of the light, that forms pixels dff and dfn, projected onto the projection plane (on the image Pf) than a shape of the pixel dfn at a position near the light emitting port 32. As a result, adjacent pixels overlap each other along the direction of the virtual optical axis Zl, which may cause quality degradation of the projected image Pf.

Therefore, in the present embodiment, by changing the shape of light that forms each of the pixels, the shape of each of the projected pixels is changed according to a distance K from the light emitting port 32 (or the light output point Rp). More specifically, it is configured to decrease a size of the pixel in the pixel extending direction with an increase in the distance K from the light emitting port 32. Thereby, the overlap of the adjacent pixels along the direction of the virtual optical axis Zl is suppressed, and the quality degradation of the projected image Pf is suppressed.

Figure 14:
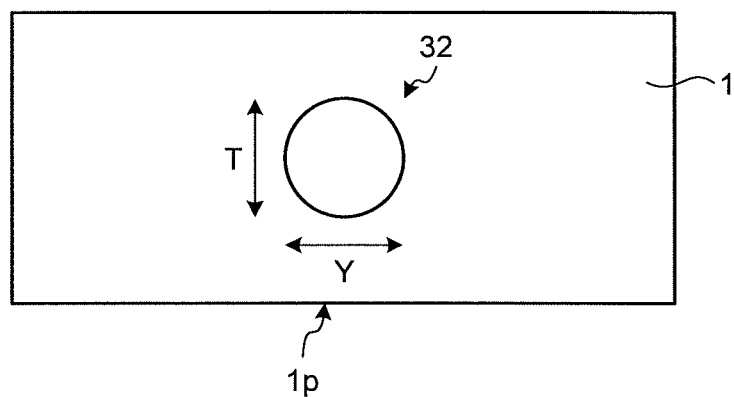
FIG. 14 is a front view of a light emitting port of the projector.
Figure 15A:
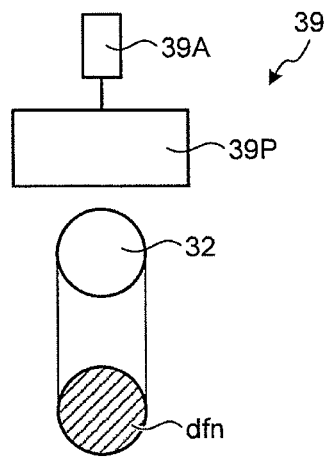
FIG. 15A is a schematic diagram of a mechanism of changing a shape of light that forms a pixel in the second projection mode.
Figure 15B:
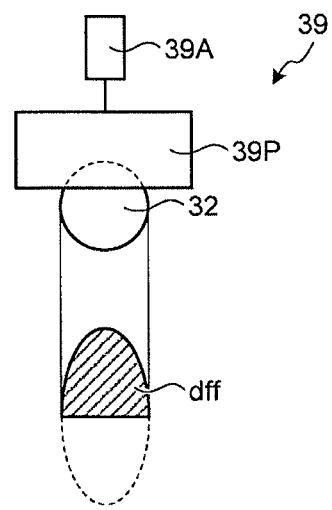
FIG. 15B is a schematic diagram of the mechanism of changing a shape of light that forms a pixel in the second projection mode.
Figure 15C:
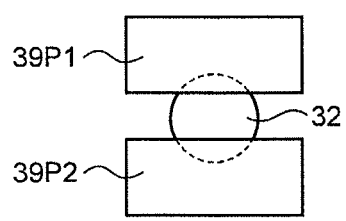
FIG. 15C is a schematic diagram of the mechanism of changing a shape of light that forms a pixel in the second projection mode.

FIG. 14 is a front view of the light emitting port of the projector. FIG. 15A to FIG. 15C are schematic diagrams of a mechanism of changing the shape of light that forms a pixel in the second projection mode. In the present embodiment, the projector controller 22a changes a height-to-width ratio T/Y of the light emitting port 32 provided in the mobile phone 1 illustrated in FIG. 14, to change the shape of light that forms the pixel in the second projection mode. The longitudinal direction (vertical) of the light emitting port 32 is a direction orthogonal to a placing surface (surface of a desk, a floor, or the like facing a target to be placed) 1p for the mobile phone 1, and a direction orthogonal to the longitudinal direction is set as a lateral direction (horizontal) of the light emitting port 32. In this case, the longitudinal direction of the light emitting port 32 corresponds to the pixel extending direction, and the lateral direction of the light emitting port 32 corresponds to the direction orthogonal to the pixel extending direction.

To change the height-to-width ratio T/Y of the light emitting port 32, as illustrated in FIG. 15A and FIG. 15B, a light blocking body 39P driven by an actuator 39A controlled by the projector controller 22a is moved in the longitudinal direction of the light emitting port 32 on a light outgoing side of the mirror 35M. In this example, the light blocking body 39P is disposed between the mirror 35M and the light emitting port 32. FIG. 15A to FIG. 15C depict states in which the light emitting port 32 is viewed from the side of the mirror 35M. As illustrated in FIG. 15C, two light blocking bodies 39P1 and 39P2 may be used so that the light emitting port 32 is sandwiched therebetween from both sides thereof in the longitudinal direction.

The light blocking body 39P is provided on the light outgoing side of the mirror 35M, that is, between the mirror 35M and the light emitting port 32, or on a traveling direction side of light reflected by the mirror 35M with respect to the light emitting port 32. Therefore, the projector controller 22a changes the height-to-width ratio of the light emitting port 32 by longitudinally moving the light blocking body 39P. Thereby, the shape of the reflected light having passed through the light emitting port 32 and emitted to the projection plane can be changed. That is, the reflected light reflected by the mirror 35M is blocked by the light blocking body 39P and part of the reflected light thereby passes through the light emitting port 32, and, as a result, the shape of the reflected light emitted to the projection plane is changed. When the reflected light emitted in the above manner reaches the projection plane to form a pixel, the size of the pixel in the pixel extending direction is reduced as illustrated in FIG. 15B.

For the pixel dfn of the image Pf at the position near the light emitting port 32 illustrated in FIG. 13, the projector controller 22a causes the reflected light to be emitted to the projection plane while preventing the reflected light from being blocked by the light blocking body 39P as illustrated in FIG. 15A. On the other hand, for the pixel dff of the image Pf at the position away from the light emitting port 32 illustrated in FIG. 13, the projector controller 22a causes the reflected light to be emitted to the projection plane while part of the reflected light is blocked, by reducing the height-to-width ratio T/Y of the light emitting port 32 using the light blocking body 39P as illustrated in FIG. 15B. The projector controller 22a reduces the rate of the height-to-width ratio T/Y of the light emitting port 32 with an increase in the distance K from the light emitting port 32, to thereby increase the rate of blocking of the reflected light by the light blocking body 39P with an increase in the distance K from the light emitting port 32.

In this way, the size in the pixel extending direction decreases with the increase in the distance K from the light emitting port 32, so that the overlap of the adjacent pixels along the direction of the virtual optical axis Zl is suppressed and the quality degradation of the projected image Pf is suppressed. The pixel dfn of the image Pf at the position near the light emitting port 32 illustrated in FIG. 13 is projected obliquely downward in the second projection mode, and this causes the shape thereof to be slightly elongated in the pixel extending direction. Therefore, for the pixel dfn of the image Pf at the position near the light emitting port 32, also, it is preferable that the projector controller 22a causes the reflected light to be emitted to the projection plane while part of the reflected light is blocked, by reducing the height-to-width ratio T/Y of the light emitting port 32 using the light blocking body 39P.

If the reflected light is blocked by the light blocking body 39P, then the amount of light emitted from the light emitting port 32 to the emission plane becomes small. Therefore, if the rate of blocking of the reflected light by the light blocking body 39P is increased with an increase in the distance K from the light emitting port 32, the image Pf becomes darker with the increase in the distance K from the light emitting port 32, which may cause unevenness in brightness over the entire image Pf. Because of this, the output of the light output from the light source 31 is increased as an emission position of the laser light emitted from the light emitting port 32 is farther away from the light emitting port 32. In other words, the projector controller 22a increases the rate of blocking of the reflected light by the light blocking body 39P and also increases the output of light output from the light source 31 with an increase in the distance K from the light emitting port 32. Thereby, in the second projection mode, the overlap of the adjacent pixels along the direction of the virtual optical axis Zl is suppressed and the unevenness in brightness is also suppressed, which leads to further suppression of the quality degradation of the projected image Pf.

Figure 16:
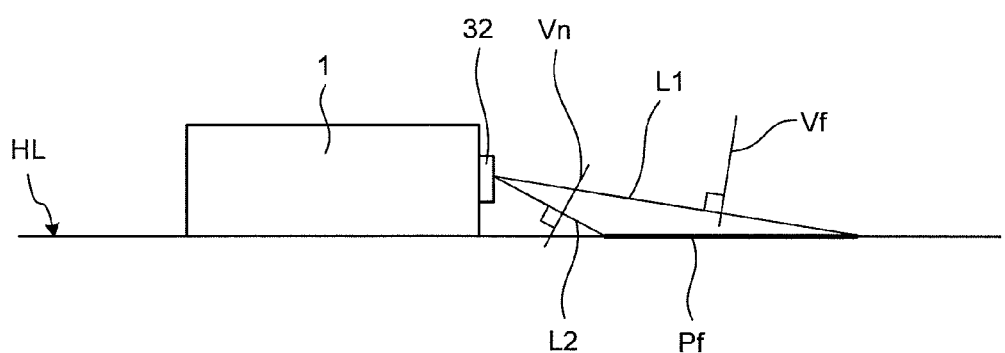
FIG. 16 is an explanatory diagram of virtual planes each orthogonal to an emission direction of light emitted from the light emitting port.
Figure 17:
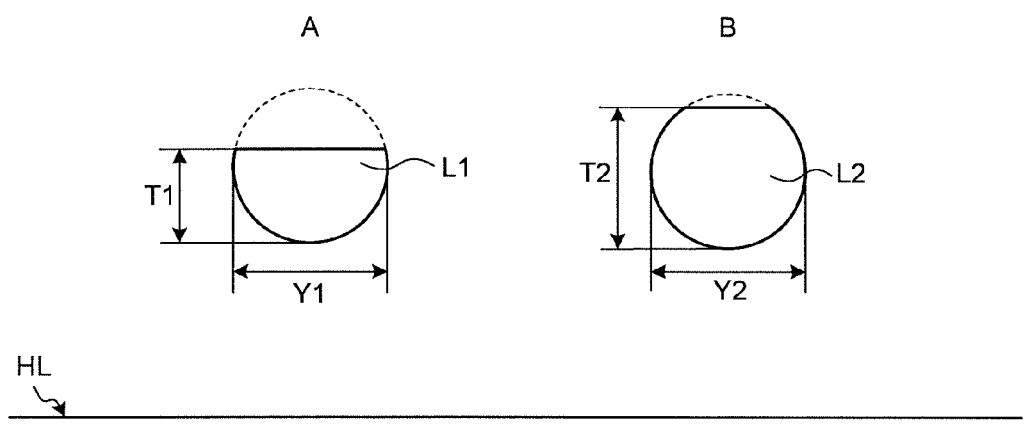
FIG. 17 is a schematic diagram of light shapes in the virtual planes of FIG. 16.

FIG. 16 is an explanatory diagram of virtual planes each orthogonal to an emission direction of light emitted from the light emitting port. FIG. 17 is a schematic diagram of light shapes in the virtual planes of FIG. 16. Virtual planes Vf and Vn orthogonal to emission directions of lights L1 and L2, respectively, emitted from the light emitting port 32 will be examined. The light L1 forms a pixel of the image Pf at a position away from the light emitting port 32, and therefore, as explained above, by reducing the height-to-width ratio T/Y of the light emitting port 32 using the light blocking body 39P, the light L1 is projected to the projection plane (in this example, the same plane as the horizontal plane HL) while part thereof is blocked. Therefore, the shape of the light L1 when the light L1 is projected to the virtual plane Vf is a laterally long shape in which a length T1 in the longitudinal direction orthogonal to the lateral direction is shorter than a length Y1 in the lateral direction parallel to the horizontal plane HL, as illustrated in A of FIG. 17.

When the second projection mode is to be executed, the projector controller 22a executes emitted-light shape change control in which the shape of the light L1 when the light L1 is projected to the virtual plane Vf is adjusted so as to be laterally long shape in which the length T1 in the longitudinal direction orthogonal to the lateral direction is shorter than the length Y1 in the lateral direction parallel to the horizontal plane HL. Thereby, even when an image is projected to the top of a desk or to a floor in the second projection mode, the overlap of adjacent pixels in the direction of the virtual optical axis Zl is suppressed, and therefore the quality degradation of the projected image is suppressed. When the mobile phone 1 is placed on the horizontal plane HL, the projector controller 22a regards this case as execution of the second projection mode, and may execute the emitted-light shape change control.

When the image projected by the projector 34 is a rectangle and the long-side direction of the image is parallel to the axis as the virtual optical axis Zl projected onto the image, the emitted-light shape change control is preferably executed. That is, when the length of the image in the direction parallel to the axis as the virtual optical axis Zl projected onto the image projected by the emitting unit 35 is longer than the length of the image in the direction orthogonal to the virtual optical axis Zl, the projector controller 22a preferably executes the emitted-light shape change control. When such an image as above is projected to the top of the desk, to the floor, or the like, the distance from the emission plane of the light increases as compared with a case where the axis as the virtual optical axis Zl projected onto the image is parallel to the short-side direction of the image. As a result, influence due to extension of the pixel increases, and thus, the emitted-light shape change control is executed when the axis as the virtual optical axis Zl projected onto the image is parallel to the long-side direction of the image, and this effectively suppresses the influence due to the overlap of pixels, thus efficiently suppressing degradation of image quality.

The light L2 forms a pixel of the image Pf at a position near the light emitting port 32, and therefore the light L2 does not need to be blocked by the light blocking body 39P. However, the pixel formed by the light L2 is also a shape elongated in the pixel extending direction although its amount is small, and, therefore, by reducing the height-to-width ratio T/Y of the light emitting port 32 using the light blocking body 39P, the light is preferably projected to the projection plane while part thereof is blocked. In this case, the shape of the light L2 when the light L2 is projected to the virtual plane Vn is also a laterally long shape in which a length T2 in the longitudinal direction orthogonal to the lateral direction is shorter than a length Y2 in the lateral direction parallel to the horizontal plane HL, as illustrated in B of FIG. 17. However, because the amount of the light L2 blocked by the light blocking body 39P is smaller than that of the light L1, of the height-to-width ratios T/Y of the lights L1 and L2 in the virtual planes Vf and Vn, the height-to-width ratio T/Y of the light L2 is larger than the other (T1/Y1<T2/Y2). In other words, the shape of the light L1 in the virtual plane Vf is laterally longer as compared with the shape of the light L2 in the virtual plane Vn.

Hereinafter, the light L1 may be called a first light and the light L2 may be called a second light. In the second projection mode, when comparing a first light L1 with a second light L2 that is emitted to the side closer to the light emitting port 32 than the first light L1, in the virtual planes Vf and Vn, respectively, among a plurality of lights emitted to form the image Pf, the projector controller 22a controls so that the shape of the first light L1 is laterally longer as compared with the shape of the second light L2. This suppresses the overlap of adjacent pixels in the direction of the virtual optical axis Zl, thus suppressing quality degradation of the projected image Pf.

Figure 18A:
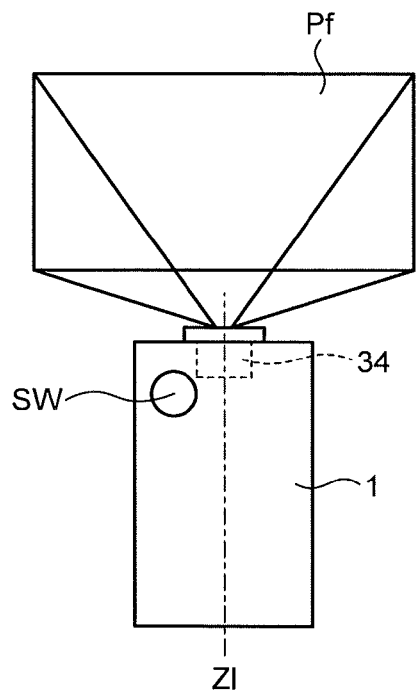
FIG. 18A is a diagram of switching of a display orientation of an image in the second projection mode.
Figure 18B:
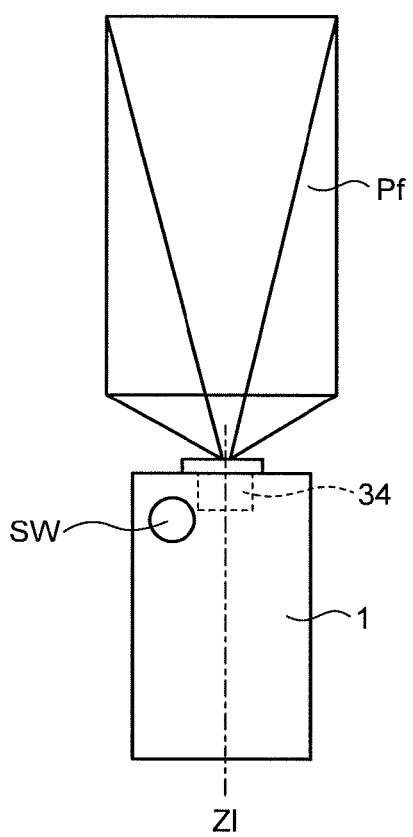
FIG. 18B is a diagram of switching of a display orientation of an image in the second projection mode.

FIG. 18A and FIG. 18B are diagrams of switching of a display orientation of an image in the second projection mode. In an example of FIG. 18A, the projector 34 of the mobile phone 1 projects the image Pf so that its long-side direction is the lateral direction (direction orthogonal to the virtual optical axis Zl). In an example of FIG. 18B, the projector 34 projects the image Pf so that its long-side direction is the longitudinal direction (direction parallel to the virtual optical axis Zl). Display orientations are switched to one another by, for example, a switch SW provided in the mobile phone 1. In this manner, switching between the display orientations of the image in the second projection mode allows an image with various contents to be displayed in an appropriate display mode.

In the second projection mode, an image is projected onto a desk, a floor, or the like, and, therefore, a usage pattern in which a projected image Pf is viewed by those who surround the mobile phone 1 being the image projecting apparatus can be considered. In this case, if the mobile phone 1 has a switching function of display directions of the image Pf, all users surrounding the mobile phone 1 can evenly view the image Pf, thus improving the convenience thereof.

Figure 19:
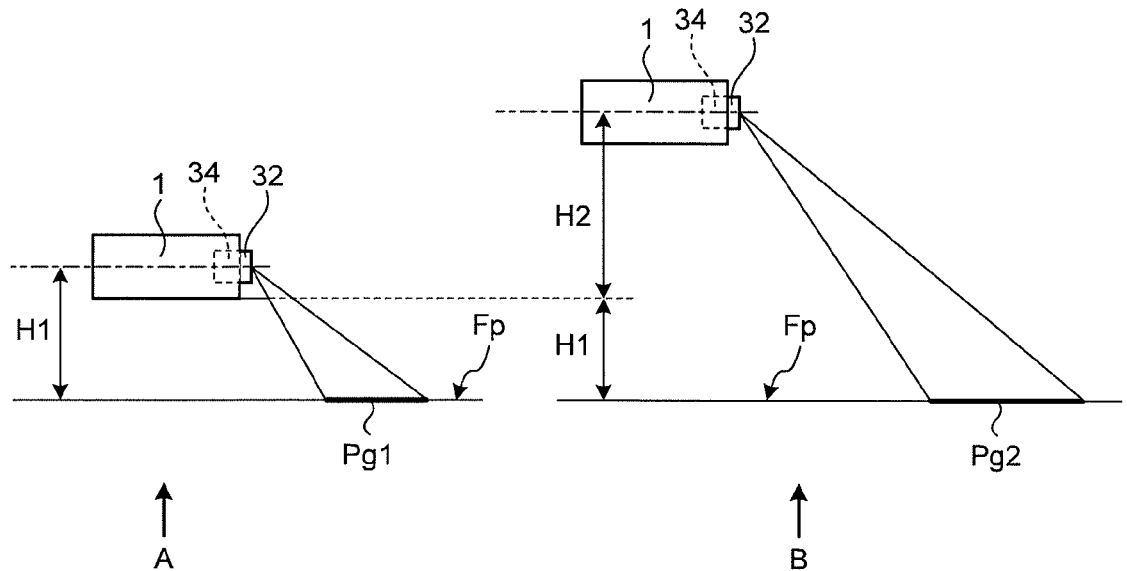
FIG. 19 is a diagram illustrating a case where the height of a mobile phone that is projecting an image in the second projection mode changes.

FIG. 19 is a diagram of a case where the height of the mobile phone that is projecting an image in the second projection mode changes. As illustrated in A of FIG. 19, a case is assumed in which the projector 34 of the mobile phone 1 projects an image Pg1 to the projection plane Fp at a position at a height H1 in the second projection mode. In this case, as illustrated in B of FIG. 19, when the height of the mobile phone 1 changes to H1+H2, the image Pg1 being projected in the second projection mode is away from the mobile phone 1 to become an image Pg2. The size of the image Pg2 becomes larger than that of the image Pg1. When the height of the mobile phone 1 is lowered than the current height, the image being projected approaches the mobile phone 1 and the size of the image becomes smaller than the size before the movement.

When the projected image moves or the size thereof changes due to the change in the height of the mobile phone 1, those who are viewing the image may have a feeling of strangeness. Therefore, when the height of the mobile phone 1 changes, the projector controller 22a controls the emitting unit 35 to incline the emission direction of the light emitted from the light emitting port 32 toward the side of the light emitting port 32 with an increase in the distance from the mobile phone 1 to the image projection target (projection plane Fp). In addition, the projector controller 22a controls the emitting unit 35 to incline the emission direction of the light emitted from the light emitting port 32 toward the opposite side to the light emitting port 32 with a decrease in the distance from the mobile phone 1 to the image projection target. Therefore, when the height of the mobile phone 1 that is projecting the image changes, the location of the projected image (more specifically, a position of an edge of the image to be projected on the light emitting port 32 side) can be set to be substantially fixed, and the image can be suppressed from its movement. As a result, even if the height of the mobile phone 1 changes, the feeling of strangeness given to those who are viewing the image can be reduced.

When the height of the mobile phone 1 changes, the projector controller 22a controls the emitting unit 35 of the projector 34 so as to maintain the size of the image projected before the change if the distance from the mobile phone 1 to the image projection target changes. This allows the change in the size of the projected image to be suppressed when the height of the mobile phone 1 that is projecting the image changes, thus reducing the feeling of strangeness given to those who are viewing the image.

As explained above, when the height of the mobile phone 1 changes and the location to which the image is projected and the size of the image are controlled, the control to change the size of the image according to the height of the mobile phone 1, that is, according to the distance between the projection plane and the mobile phone 1 may sometimes be needed. Generally, it is considered that the feeling of strangeness given to those who are viewing the image is not so much if the projected image does not move. Therefore, when the location to which the image is projected and the size of the image are controlled, it is preferable to set at least the location to which the image is projected to be substantially fixed.

Figure 20:
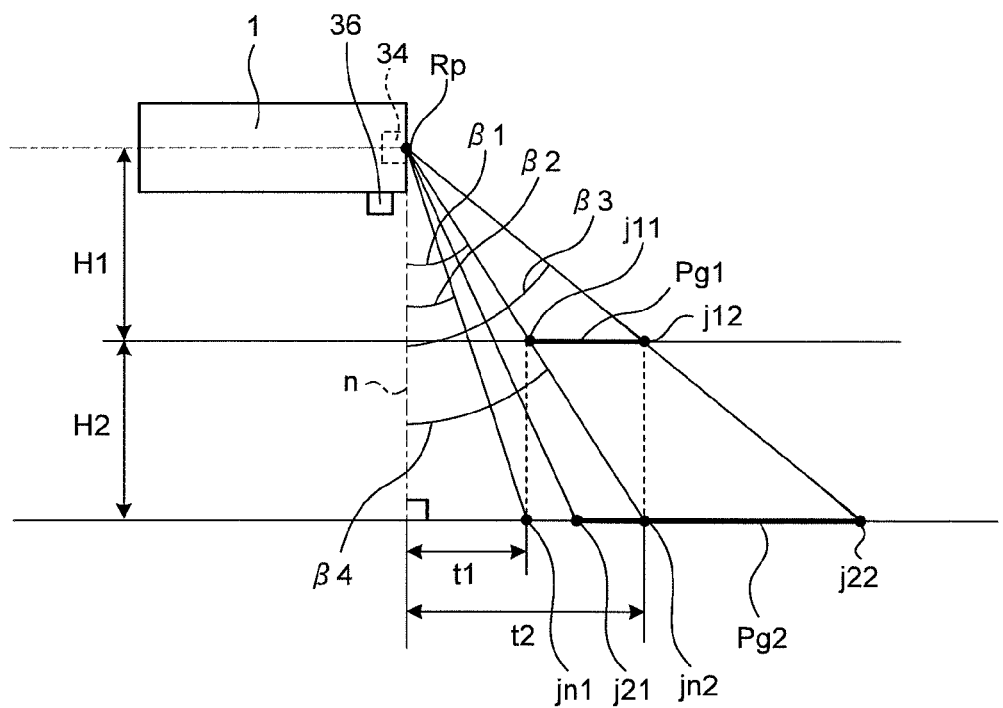
FIG. 20 is a diagram for explaining control of image projection when the height of the mobile phone that is projecting an image in the second projection mode changes.

FIG. 20 is a diagram for explaining control of image projection when the height of the mobile phone that is projecting an image in the second projection mode changes. To implement the control (image projection location control) when the height of the mobile phone 1 that is projecting an image changes, the mobile phone 1 detects its own height by using the distance sensor 36. The distance sensor 36 is disposed so as to face the projection plane, and detects a distance between the mobile phone 1 and the projection plane.

A case is assumed in which the height of the mobile phone 1 changes from H1 to H1+H2. In this case, an image emitted by the projector 34 at the height H1 is illustrated as Pg1, and an image emitted by the projector 34 at the height H1+H2 is illustrated as Pg2. The height H1 and the height H1+H2 are vertical distances from the projection plane Fp to the light output point Rp.

A perpendicular line drawn from the light output point Rp to the projection plane Fp is illustrated as n. A distance from the perpendicular line n to an edge j11 of the image Pg1 on the side near the light output point Rp is illustrated as t1, and a distance from the perpendicular line n to an edge j12 of the image Pg1 on the side away from the light output point Rp is illustrated as t2. An edge of the image Pg2 on the side near the light output point Rp is illustrated as j21, and an edge of the image Pg2 on the side away from the light output point Rp is illustrated as j22. An edge of the image Pg2 on the side near the light output point Rp and an edge thereof on the side away from the light output point Rp, after the image projection location control is executed, is illustrated as jn1 and jn2, respectively.

A narrow-angle between the perpendicular line n and a line segment connecting the light output point Rp and the edge j11 of the image Pg1 is illustrated as $\beta 1$, and a narrow-angle between the perpendicular line n and a line segment connecting the light output point Rp and the edge jn1 obtained through the image projection location control is illustrated as $\beta 2$. A narrow-angle between the perpendicular line n and a line segment connecting the light output point Rp and the edge j22 of the image Pg2 is illustrated as $\beta 3$, and a narrow-angle between the perpendicular line n and a line segment connecting the light output point Rp and the edge jn2 obtained through the image projection location control is illustrated as $\beta 4$.

By executing the image projection location control, the edge j21 of the image Pg2 moves to the edge jn1, and the edge j22 of the image Pg2 moves to the edge jn2. A distance from the perpendicular line n to the edge jn1 on the side near the light output point Rp is t1, and a distance from the perpendicular line n to the edge jn2 on the side away from the light output point Rp is t2. Therefore, Equation (8) and Equation (9) as follows hold.

$$t1 = H1 \times \tan \beta 1 = (H1+H2) \times \tan \beta 2 \qquad (8)$$

$$t2 = H1 \times \tan \beta 3 = (H1+H2) \times \tan \beta 4 \qquad (9)$$

The angles $\beta 1$ and $\beta 3$ can be acquired from control information of the mirror 35M illustrated in FIG. 4, and therefore the angles $\beta 2$ and $\beta 4$ can be calculated from Equation (8) and Equation (9). The projector controller 22a executes the operations of calculating the angles β2 and β4, and controls the mirror 35M so that angles will be the obtained angles β2 and β4. Thereby, the image projection location control can be implemented.

In the above explanation, the mobile phone 1 being the image projecting apparatus provided with at least two modes: the first projection mode and the second projection mode is used as an example, however, the image projecting apparatus according to the present embodiment is not limited to the mobile phone 1. For example, the image projecting apparatus according to the present embodiment may be provided with only the second projection mode.

Industrial Applicability

As explained above, the image projecting apparatus according to the present invention is useful, for example, for the case where an image is projected to the top of a desk or to a floor.

The invention claimed is:

1. An image projecting apparatus for projecting an image, the image projecting apparatus comprising:
   a light source for outputting light to form the image;
   a light emitting port;
   an emitting unit for causing the light emitted from the light source to be emitted from the light emitting port in such a manner that an emission direction of the light emitted from the light emitting port is variable; and
   a control unit for controlling the light source and the emitting unit to switch between
      a first projection mode in which the emission direction of the light emitted from the light emitting port, when the image projecting apparatus is placed on a horizontal plane, is a front direction of the light emitting port or obliquely upward with respect to the horizontal plane and
      a second projection mode in which the emission direction of the light emitted from the light emitting port, when the image projecting apparatus is placed on the horizontal plane, is obliquely downward with respect to the horizontal plane,
   wherein, in the second projection mode, the image is projected, by the light coming directly from the light emitting port, on the horizontal plane or on a plane under the horizontal plane.

2. The image projecting apparatus according to claim 1, wherein the emitting unit comprises a Micro Electro Mechanical System (MEMS) minor.

3. The image projecting apparatus according to claim 1, wherein the image projecting apparatus is a mobile communication unit.

4. The image projecting apparatus according to claim 1, wherein the image projecting apparatus is a portable projector.

5. An image projecting apparatus for projecting an image, the image projecting apparatus comprising:
   a light source for outputting laser light to form the image;
   a light emitting port;
   an emitting unit that for causing the laser light emitted from the light source to be emitted from the light emitting port in such a manner that an emission direction of the laser light emitted from the light emitting port is variable; and
   a control unit for controlling the light source and the emitting unit to switch between
      a first projection mode in which the emission direction of the laser light emitted from the light emitting port, when the image projecting apparatus is placed on a horizontal plane, is a direction facing the light emitting port or obliquely upward with respect to the horizontal plane and
      a second projection mode in which the emission direction of the laser light emitted from the light emitting port, when the image projecting apparatus is placed on the horizontal plane, is obliquely downward with respect to the horizontal plane,
   wherein, in the second projection mode, the image is projected, by the laser light coming directly from the light emitting port, on the horizontal plane or on a plane under the horizontal plane.

6. The image projecting apparatus according to claim 5, wherein, when executing the second projection mode,
   the control unit is configured to execute control for adjustment so that a shape of the laser light, which is formed on a virtual plane orthogonal to the emission direction of the laser light emitted from the light emitting port when the laser light emitted from the light emitting port is projected to the virtual plane, is a laterally long shape whose length in a longitudinal direction orthogonal to a lateral direction is shorter than a length thereof in the lateral direction parallel to the horizontal plane.

7. The image projecting apparatus according to claim 6, wherein the control unit is configured to execute the control for the adjustment when the image projecting apparatus is placed on the horizontal plane.

8. The image projecting apparatus according to claim 6, wherein
   the control unit is configured to execute the control for the adjustment when a length of the image in a direction parallel to a virtual optical axis, which is orthogonal to an emission plane of the light emitting port, is longer than a length of the image in a direction orthogonal to the virtual optical axis.

9. The image projecting apparatus according to claim 6, wherein
   the control unit is configured to execute the control for the adjustment of a first light and a second light, among a plurality of lights emitted to form the image in the second projection mode, in such a manner that a shape of the first light is laterally longer than a shape of the second light on the respective virtual plane, and
   the second light is emitted to a side nearer to the light emitting port than the first light.

10. The image projecting apparatus according to claim 6, wherein the control unit is configured to execute the control for the adjustment by changing a height-to-width ratio of the light emitting port.

11. The image projecting apparatus according to claim 5, wherein
   the control unit is configured to change the emission direction of light emitted from the light source so that a plurality of pixels that constitute the image formed by the laser light emitted from the light emitting port are arranged with distances between adjacent pixels in a first direction equal to each other and with distances between adjacent pixels in a second direction orthogonal to the first direction equal to each other.

12. The image projecting apparatus according to claim 5, wherein
   the control unit is configured to increase the output of the laser light output from the light source as an emission position of the laser light emitted from the light emitting port is farther away from the light emitting port.

13. The image projecting apparatus according to claim 5, further comprising:

a distance measuring unit for measuring a distance from the image projecting apparatus to an image projection target, wherein the control unit is configured to incline the emission direction of the laser light emitted from the light emitting port toward a side of the light emitting port with an increase in the distance so that a location to which the image is projected is substantially fixed.

14. The image projecting apparatus according to claim 5, wherein the control unit is configured to switch between the first projection mode and the second projection mode when the image projecting apparatus is turned upside down.

15. The image projecting apparatus according to claim 5, further comprising:

an operation unit for detecting an operation, wherein the control unit is configured to switch display operation of the image projected in the second projection mode in accordance with the operation detected by the operation unit.

16. An image projecting apparatus for projecting an image, the image projecting apparatus comprising:

a light source for outputting light to form an image;

a light emitting port;

an emitting unit for causing the light emitted from the light source to be emitted from the light emitting port in such a manner that an emission direction of the light emitted from the light emitting port is variable; and a control unit for controlling the light source and the emitting unit to control a projection state of the image to be projected, wherein, when a projection mode, in which the emission direction of the light emitted from the light emitting port is obliquely downward with respect to a horizontal plane when the image projecting apparatus is placed on the horizontal plane, is executed, the control unit is configured to change the emission direction of the light emitted from the light source so that a plurality of pixels constituting the image formed by the light emitted from the light emitting port are arranged with distances between adjacent pixels in a first direction equal to each other and with distances between adjacent pixels in a second direction orthogonal to the first direction equal to each other, and the control unit is configured to control the light source and the emitting unit to project the image, by the light coming directly from the light emitting port, on the horizontal plane or on a plane under the horizontal plane.

17. The image projecting apparatus according to claim 16, wherein the control unit is configured to execute control for adjustment so that a shape of the light, which is formed on a virtual plane orthogonal to the emission direction of the light emitted from the light emitting port when the light emitted from the light emitting port is projected to the virtual plane, is a laterally long shape whose length in a longitudinal direction orthogonal to a lateral direction is shorter than a length thereof in the lateral direction parallel to the horizontal plane.

18. An image projecting apparatus for projecting an image, the image projecting apparatus comprising:

a light source for outputting light to form the image;

a light emitting port;

an optical system for varying a direction of the light output from the light emitting port; and a control unit for controlling the optical system to switch between a first projection mode in which the image is projected on a first plane and a second projection mode in which the image is projected, by the light coming directly from the light emitting port, on a second plane substantially perpendicular to the first plane, without changing an attitude of the image projecting apparatus, wherein the second plane is a horizontal plane on which the image projecting apparatus is placed or a plane which is under the horizontal plane.

\* \* \* \* \*